United States Patent
Ha et al.

(10) Patent No.: US 10,505,752 B2
(45) Date of Patent: Dec. 10, 2019

(54) ELECTRONIC APPARATUS AND METHOD OF CONTROLLING GROUP ACTION

(71) Applicant: Samsung Electronics Co., Ltd., Suwon-si, Gyeonggi-do (KR)

(72) Inventors: Ji-hun Ha, Seoul (KR); Min-ho Lee, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 243 days.

(21) Appl. No.: 14/953,184

(22) Filed: Nov. 27, 2015

(65) Prior Publication Data

US 2016/0173318 A1 Jun. 16, 2016

(30) Foreign Application Priority Data

Dec. 15, 2014 (KR) .................. 10-2014-0180495
Dec. 23, 2014 (KR) .................. 10-2014-0187564

(51) Int. Cl.
*H04L 12/28* (2006.01)
*H04W 4/08* (2009.01)

(52) U.S. Cl.
CPC ............ *H04L 12/282* (2013.01); *H04W 4/08* (2013.01); *H04L 2012/2841* (2013.01)

(58) Field of Classification Search
CPC . H04L 12/282; H04L 2012/2841; H04W 4/08
See application file for complete search history.

(56) References Cited

U.S. PATENT DOCUMENTS

| 6,742,037 B1* | 5/2004 | Hall | H04W 92/18 |
|---|---|---|---|
| | | | 701/300 |
| 8,577,392 B1* | 11/2013 | Pai | H04W 4/029 |
| | | | 455/456.3 |
| 8,901,442 B1* | 12/2014 | Dilone | A45C 13/18 |
| | | | 177/127 |
| 2006/0259184 A1 | 11/2006 | Hayes et al. | |
| 2009/0072991 A1 | 3/2009 | Hayashi et al. | |
| 2013/0082827 A1 | 4/2013 | Cho et al. | |
| 2013/0185079 A1 | 7/2013 | Park et al. | |
| 2013/0288802 A1 | 10/2013 | Lambourne et al. | |
| 2014/0167929 A1 | 6/2014 | Shim et al. | |
| 2014/0176310 A1* | 6/2014 | Kotlicki | G08C 17/02 |
| | | | 340/12.5 |
| 2014/0244568 A1 | 8/2014 | Goel et al. | |

(Continued)

*Primary Examiner* — Angela Nguyen
(74) *Attorney, Agent, or Firm* — Jefferson IP Law, LLP

(57) ABSTRACT

An electronic apparatus and a method of controlling a group action, the method being performed by the electronic apparatus are provided. An electronic apparatus and a method of controlling a group action, the method being performed by the electronic apparatus that is capable of creating the group action corresponding to a status change of an external apparatus and is also capable of controlling the external apparatus are provided. Some embodiments provide an electronic apparatus and a method of controlling a group action, the method being performed by the electronic apparatus that is capable of creating the group action corresponding to status information of an external apparatus, which is received from a server, and is also capable of changing a status of the external apparatus via the created group action.

19 Claims, 25 Drawing Sheets

(56) References Cited

U.S. PATENT DOCUMENTS

| | | | | |
|---|---|---|---|---|
| 2015/0006695 A1* | 1/2015 | Gupta | ...................... | H04L 41/32 709/223 |
| 2015/0277463 A1* | 10/2015 | Hazzard | .............. | F24D 19/1063 700/295 |
| 2015/0319006 A1* | 11/2015 | Plummer | ............ | H04L 12/2827 700/83 |

* cited by examiner

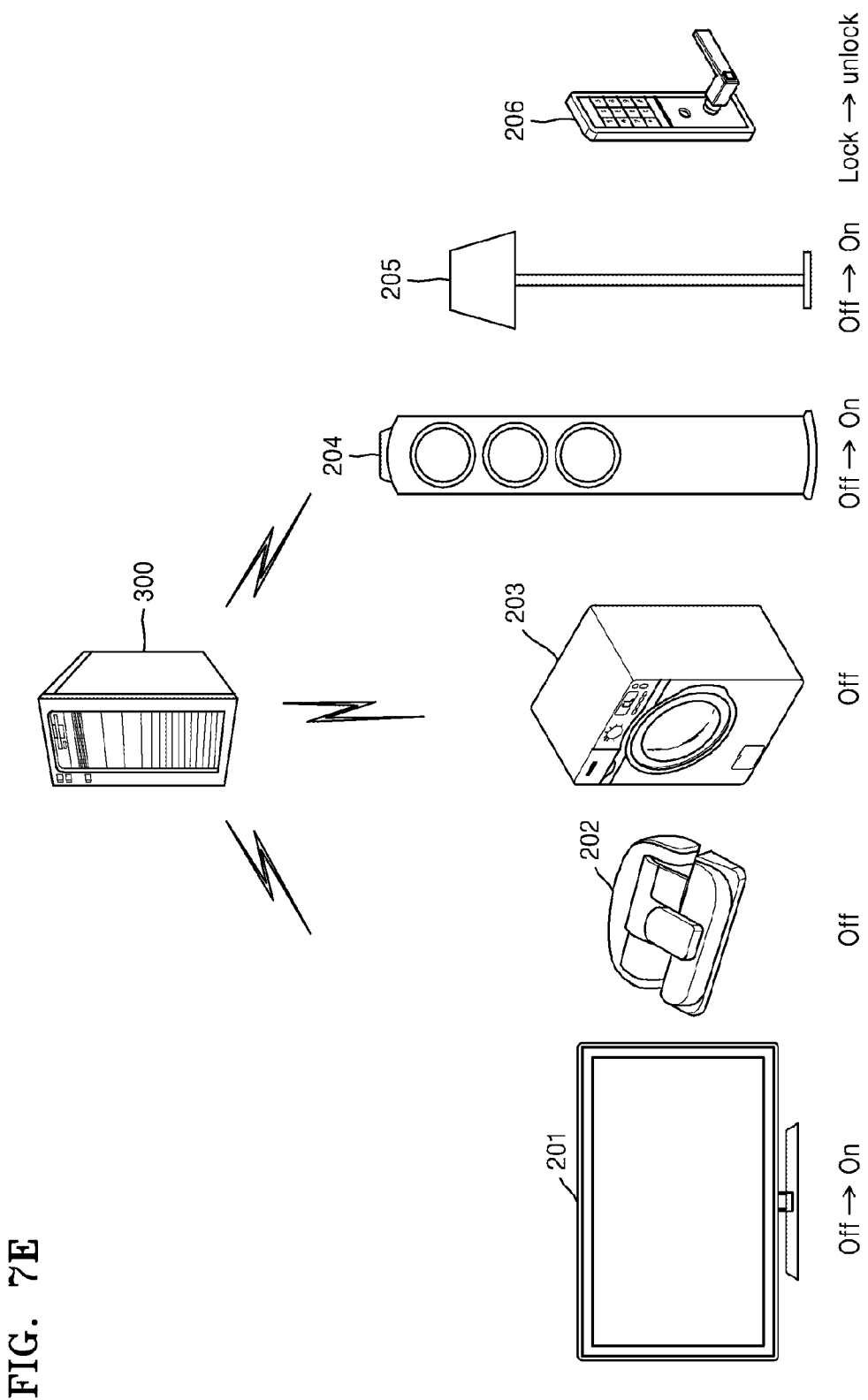

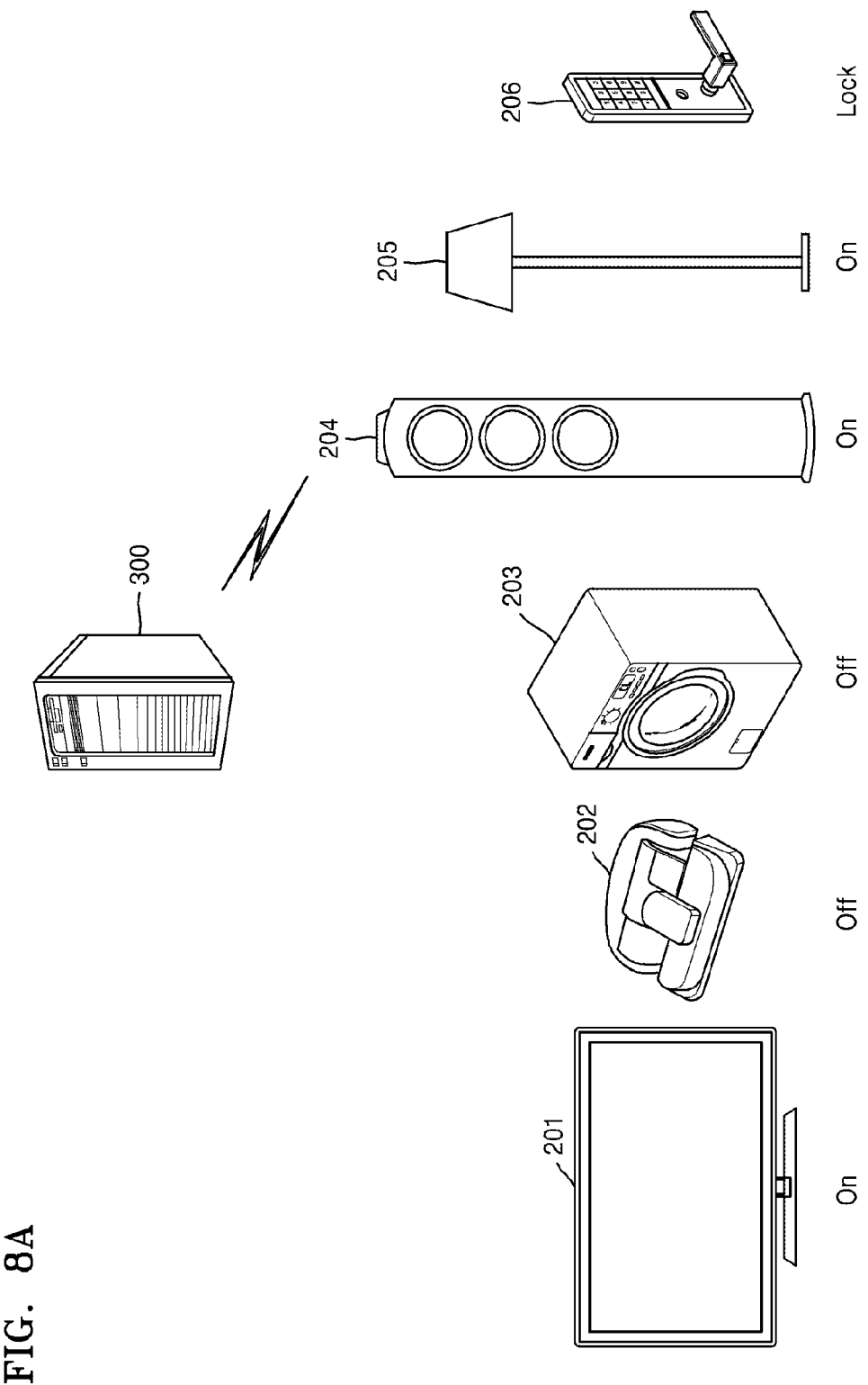

ELECTRONIC APPARATUS AND METHOD OF CONTROLLING GROUP ACTION

CROSS-REFERENCE TO RELATED APPLICATION(S)

This application claims the benefit under 35 U.S.C. § 119(a) of a Korean patent application filed on Dec. 15, 2014 in the Korean Intellectual Property Office and assigned Serial number 10-2014-0180495, and of a Korean patent application filed on Dec. 23, 2014 in the Korean Intellectual Property Office and assigned Serial number 10-2014-0187564, the entire disclosure of each of which is hereby incorporated by reference.

TECHNICAL FIELD

The present disclosure relates to an electronic apparatus and a method of controlling a group action, the method being performed by the electronic apparatus. More particularly, the present disclosure relates to an electronic apparatus and a method of controlling a group action, the method being performed by the electronic apparatus that is capable of creating and modifying the group action corresponding to a change in a status of an external apparatus and is also capable of changing the status of the external apparatus via the group action.

BACKGROUND

Recently, electronic apparatuses provide various services and functions that may be multitasked. Various applications that correspond to an Internet of Things (IoT) environment are being developed.

The IoT environment indicates an environment where things are connected to the Internet through various communication technologies. Objects around a user may communicate with each other or with the user through the Internet.

In the IoT environment, control (e.g., start of an operation, end of an operation, power on or off, etc.) between an object and an electronic apparatus carried by a user is generally performed by using an application installed in the electronic apparatus. However, in the IoT environment consisting of the electronic apparatus and a plurality of objects, it takes a long time to register each of the objects in the electronic apparatus by using the application installed in the electronic apparatus. In addition, an inconvenient and complicated procedure may be required for the user to control each of the registered objects by using the electronic apparatus.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus and a method of controlling a group action.

In accordance with an aspect of the present disclosure, a method of controlling a group action, the method being performed by an electronic apparatus that is connectable to an external apparatus and a server are provided. The method includes executing an application, requesting external apparatus status information of the external apparatus from the server, displaying, on a screen of the application, the external apparatus status information, and creating a group action corresponding to the external apparatus status information, wherein the external apparatus status information includes status information of the external apparatus whose status is manually changed according to a user input.

In accordance with another aspect of the present disclosure, a method of controlling a group action corresponding to a status of an external apparatus, the method being performed by an electronic apparatus that is connectable to the external apparatus and a server are provided. The method includes executing an application, when a status of the electronic apparatus is changed, requesting status information of the external apparatus from the server, displaying, on a screen of the application, a recommended group action list that corresponds to the change in the status of the electronic apparatus, receiving an input of selecting one of recommended group actions from the recommended group action list, and executing the selected recommended group action, wherein the recommended group actions are changed by a user's input.

In accordance with another aspect of the present disclosure, an electronic apparatus is provided. The electronic apparatus includes a touchscreen, a communication unit configured to connect to a server, and a control unit configured to request external apparatus status information of an external apparatus from the server, and create a group action by using the external apparatus status information that is received from the server and is displayed on the touchscreen, and wherein the external apparatus status information includes status information of the external apparatus that is manually changed according to a user input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 7A to 7E illustrate example screens of an electronic apparatus according to various embodiments of the present disclosure; and FIGS. 8A to 8G illustrate example screens of an electronic apparatus according to various embodiments of the present disclosure.

Throughout the drawings, it should be noted that like reference numbers are used to depict the same or similar elements, features, and structures.

DETAILED DESCRIPTION

Figure 1:
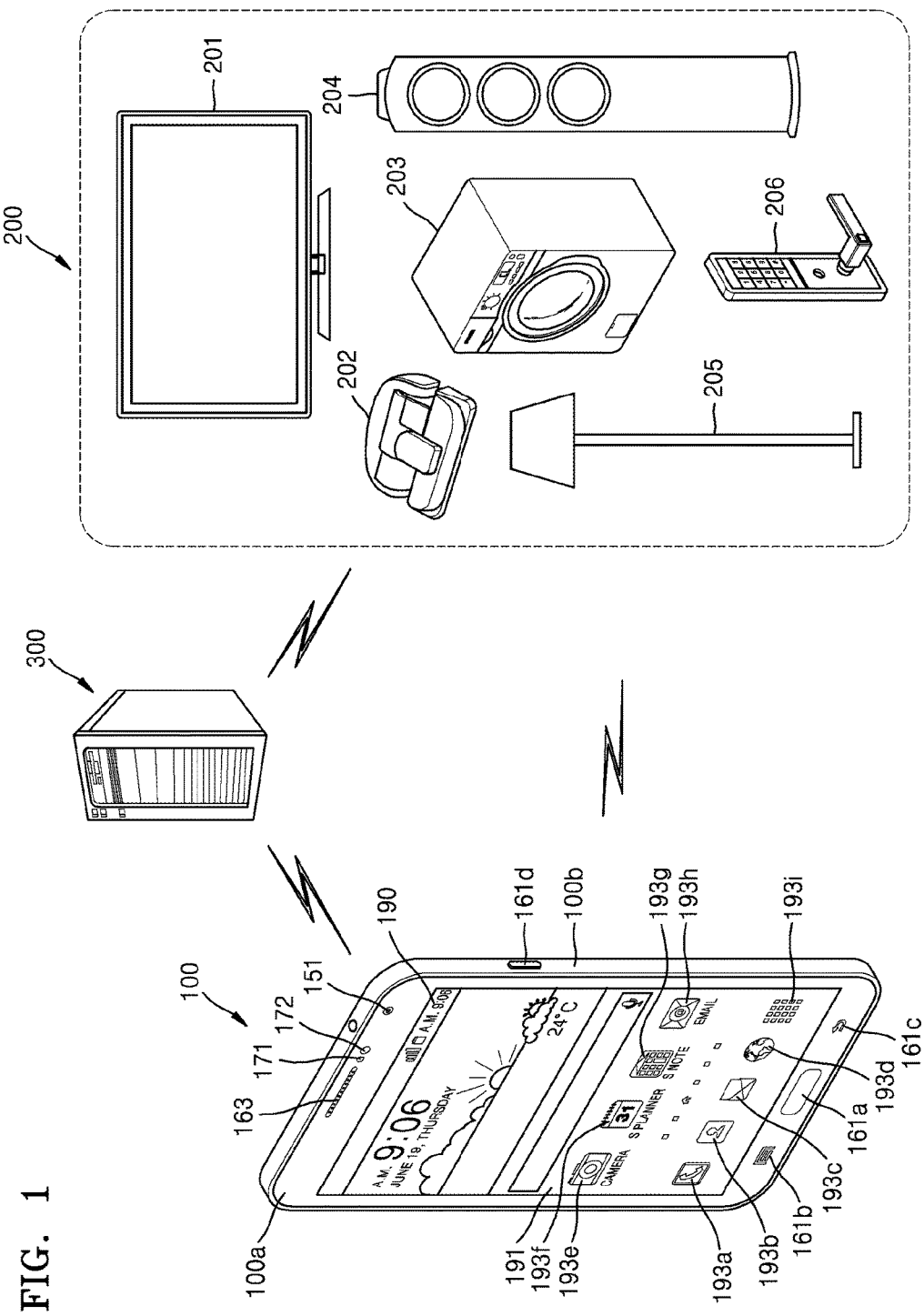
FIG. 1 illustrates connections between an electronic apparatus, an external apparatus, and a server according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While terms "first" and "second" are used to describe various components, it is obvious that the components are not limited to the terms "first" and "second". The terms "first" and "second" are used to distinguish between each component. For example, a first component may indicate a second component or a second component may indicate a first component without conflicting with the inventive concept. As used herein, the term "and/or" includes any and all combinations of one or more of the associated listed items.

Throughout the specification, the term "application" means software that is executed in a computer operating system (OS) or a mobile OS and is used by a user. For example, the application may include a word processor application, a spread sheet application, a contacts application, a calendar application, a memo application, an alarm application, a social network service (SNS) application, a chatting application, a map application, a music player application, or a video player application. In one or more embodiments, the application may mean software that is executed in an electronic apparatus or an external apparatus (e.g., a server, etc.) connected by wire or wirelessly to the electronic apparatus. Also, in one or more embodiments, the application may mean software that is executed in the electronic apparatus in response to a received user input.

In one or more embodiments, a status of an external apparatus 200 may mean a context of the external apparatus 200. Status information corresponding to the status of the external apparatus 200 may mean context information of the external apparatus 200. A change in the status (hereinafter, referred to as "status change") of the external apparatus 200 may mean a change in the context information of the external apparatus 200.

Throughout the specification, "content" may be displayed using an executed application. For example, the content may include a video file or an audio file reproduced by a video player that is one of applications, a music file reproduced by a music player, a photo file displayed in a photo gallery, a web page file displayed via a web browser, or the like. The content may include a video file, an audio file, a text file, an image file, or a webpage that is displayed or executed by the application. In one or more embodiments, the term "video" may mean a moving picture. The content may include a video file, an audio file, a text file, an image file, or a webpage that is executed according to a user input (e.g., a touch, etc.).

The content may include a screen of the executed application, and a user interface that configures the screen of the executed application. The content may include one item of content or a plurality of contents.

Throughout the specification, the term "widget" means a mini-application that is one of graphical user interfaces (GUIs) that support interoperation between a user and an application or an OS. For example, the widget may include a weather widget, a calculator widget, a clock widget, or the like.

Throughout the specification, the term "group action" may mean a set of actions of one or more external apparatuses, and at least one action included in the group action may include a control command for changing a status of an external apparatus related to the at least one action. When the group action is created, group action information corresponding to the group action may be generated and may be stored. The group action information may include information about whether or not to perform a set operation (e.g., a status change) of external apparatuses, which corresponds to a set context. For example, the group action information may include, but is not limited to, a group action title, an external apparatus identifier (ID), an external apparatus name, status change information (e.g., On↔OFF, etc.) with respect to the external apparatus, status change condition information (e.g., 5 minutes of a limited period) with respect to the external apparatus, or the like.

Throughout the specification, all examples and conditional language recited herein are to be construed as being without limitation to such specifically recited examples and conditions. Throughout the specification, a singular form may include plural forms, unless there is a particular description contrary thereto. Also, terms such as "comprise" or "comprising" are used to specify existence of a recited form, a number, a process, an operation, a component, an element, and/or groups thereof, not excluding the existence of one or more other recited forms, one or more other numbers, one or more other processes, one or more other operations, one or more other components, one or more other elements and/or groups thereof. Like numbers in the drawings refer to like elements that perform substantially the same functions throughout.

Expressions such as "at least one of," when preceding a list of elements, modify the entire list of elements and do not modify the individual elements of the list.

FIG. 1 illustrates connections between an electronic apparatus, an external apparatus, and a server according to an embodiment of the present disclosure.

Figure 2A:
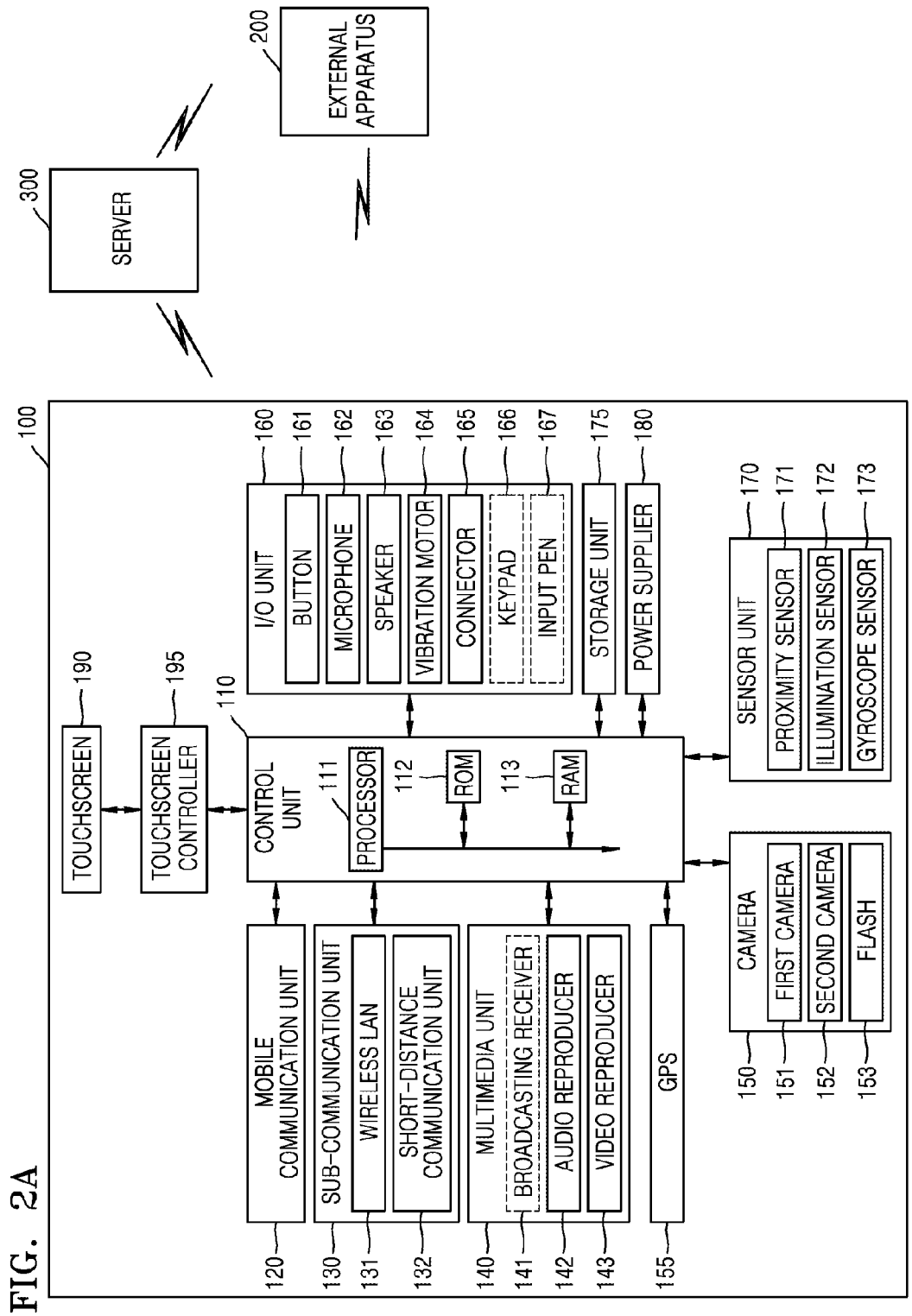
FIG. 2A is a block diagram of an electronic apparatus according to an embodiment of the present disclosure.
Figure 2B:
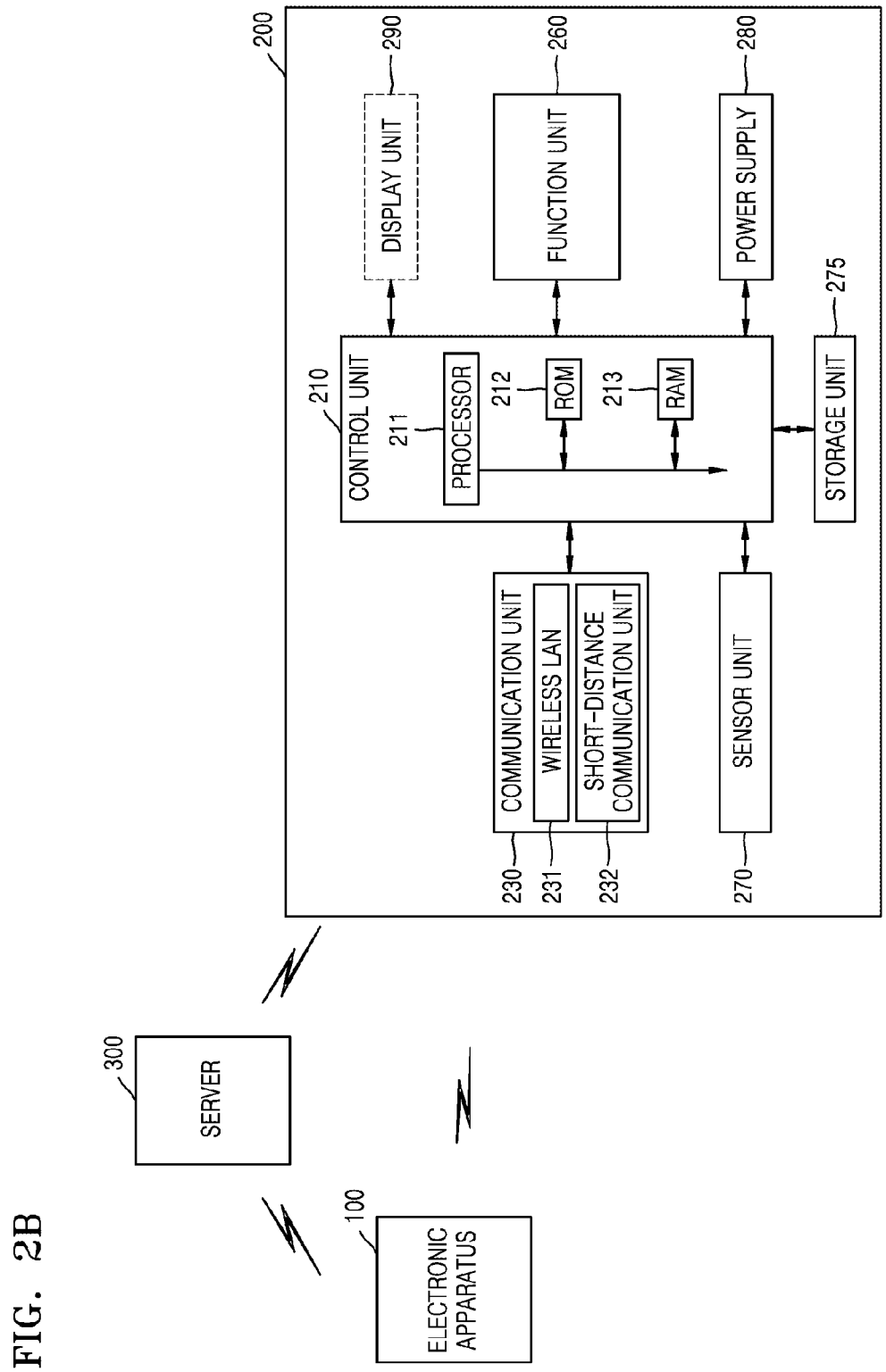
FIG. 2B is a block diagram of an external apparatus according to an embodiment of the present disclosure.
Figure 2C:
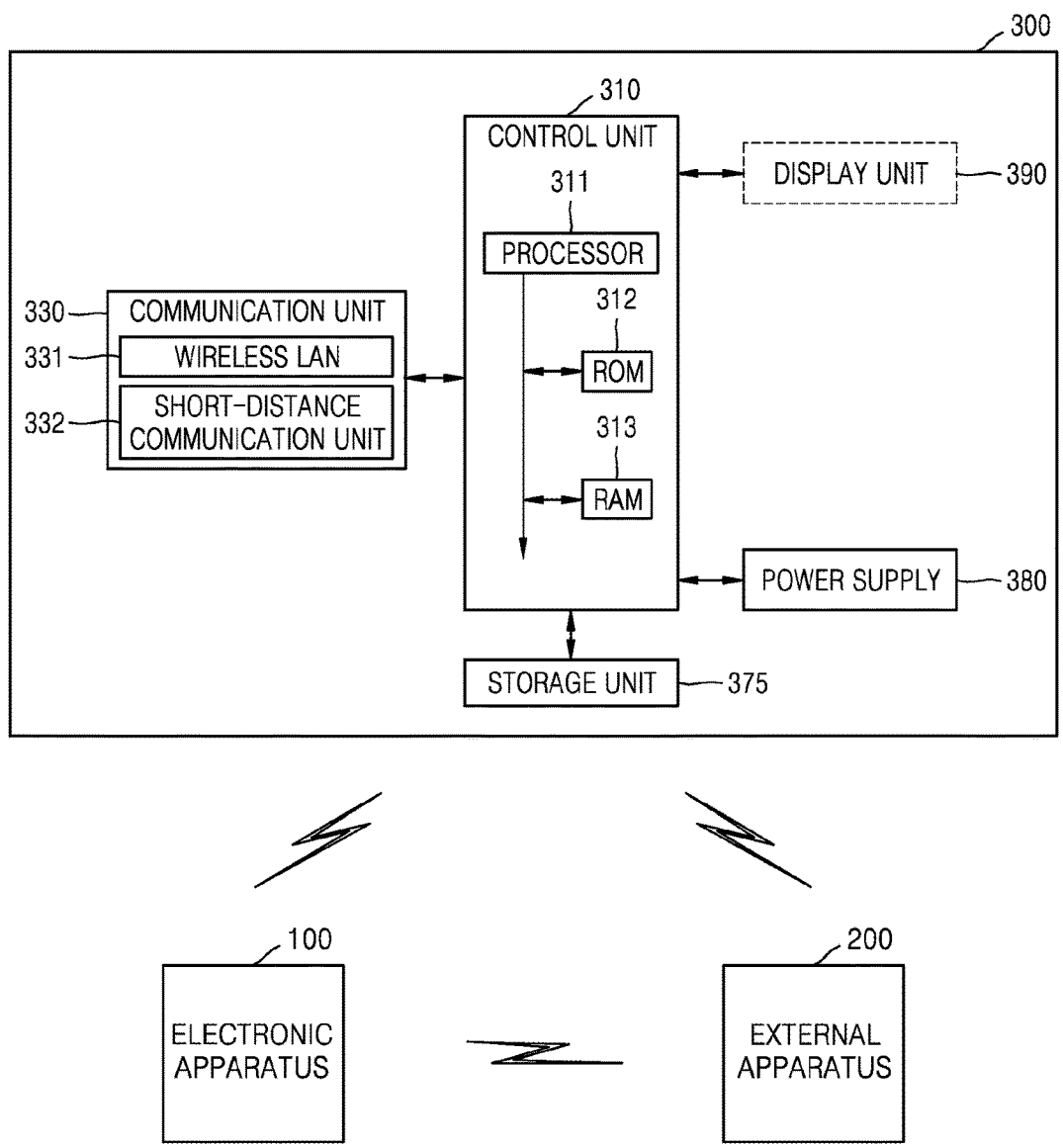
FIG. 2C is a block diagram of a server according to an embodiment of the present disclosure.

Referring to FIG. 1, an electronic apparatus 100, a server 300, and an external apparatus 200 may be wirelessly connected to each other by using their communication units (refer to FIGS. 2A to 2C). For example, the electronic apparatus 100, the server 300, and the external apparatus 200 may be connected in an intra-structure mode in which apparatuses are wirelessly connected to each other via an ad-hoc mode or an access point (AP). The electronic apparatus 100 and the external apparatus 200 may be wirelessly connected to the server 300. Alternatively, the electronic apparatus 100 may be directly wirelessly connected to the external apparatus 200.

Wireless communication may include, but is not limited to, wireless local area network (LAN) such as Wi-Fi, Bluetooth, Bluetooth low energy (BLE), ZigBee, Wi-Fi Direct (WFD), ultra wideband (UWB), infrared data association (IrDA), and near field communication (NFC). Also, the electronic apparatus 100, the server 300, and the external apparatus 200 may be connected by wire to each other by using a connector.

The electronic apparatus 100 may receive, from the server 300 and via an application 600 (refer to FIG. 6C), status change information corresponding to a change (e.g., power on or off, channel change, etc.) in a status of a display apparatus 201 that is one type of the external apparatus 200. Alternatively, the electronic apparatus 100 may directly receive, from the display apparatus 201 rather than from the server 300, and via the application 600 (refer to FIG. 6C), the status change information corresponding to the change (e.g., power on or off, channel change, etc.) in the status of the display apparatus 201 that is one type of the external apparatus 200.

Figure 6A:
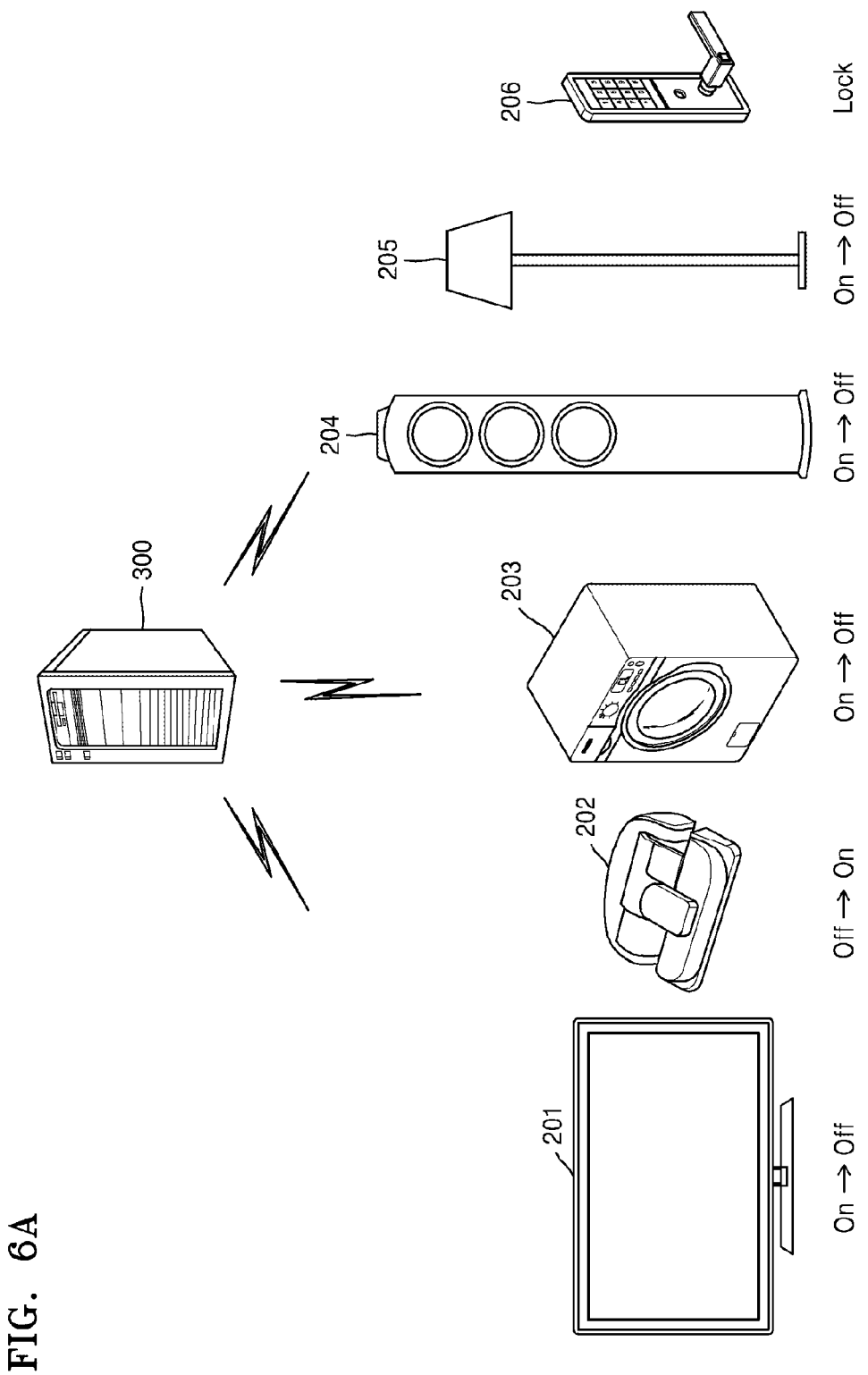
FIGS. 6A to 6F illustrate example screens of an electronic apparatus according to various embodiments of the present disclosure.
Figure 6B:
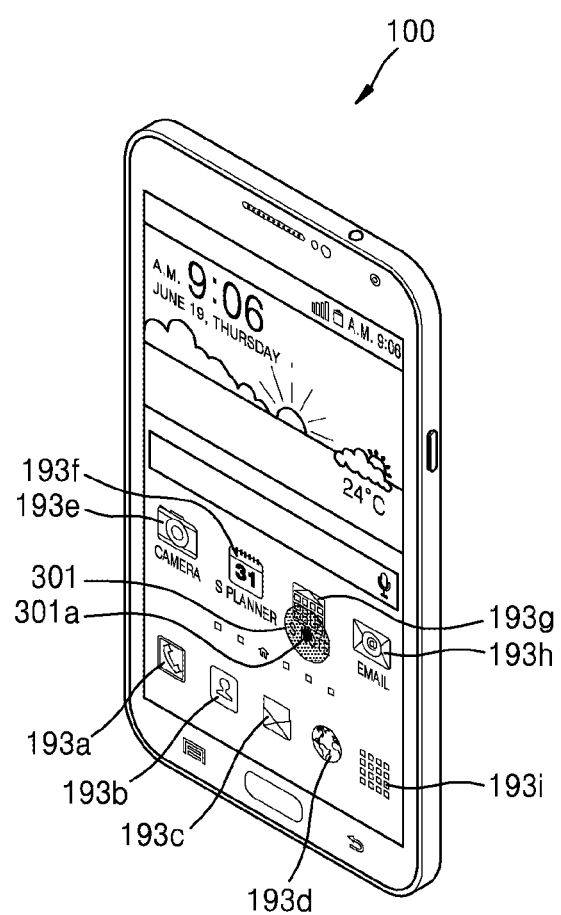
Figure 6C:
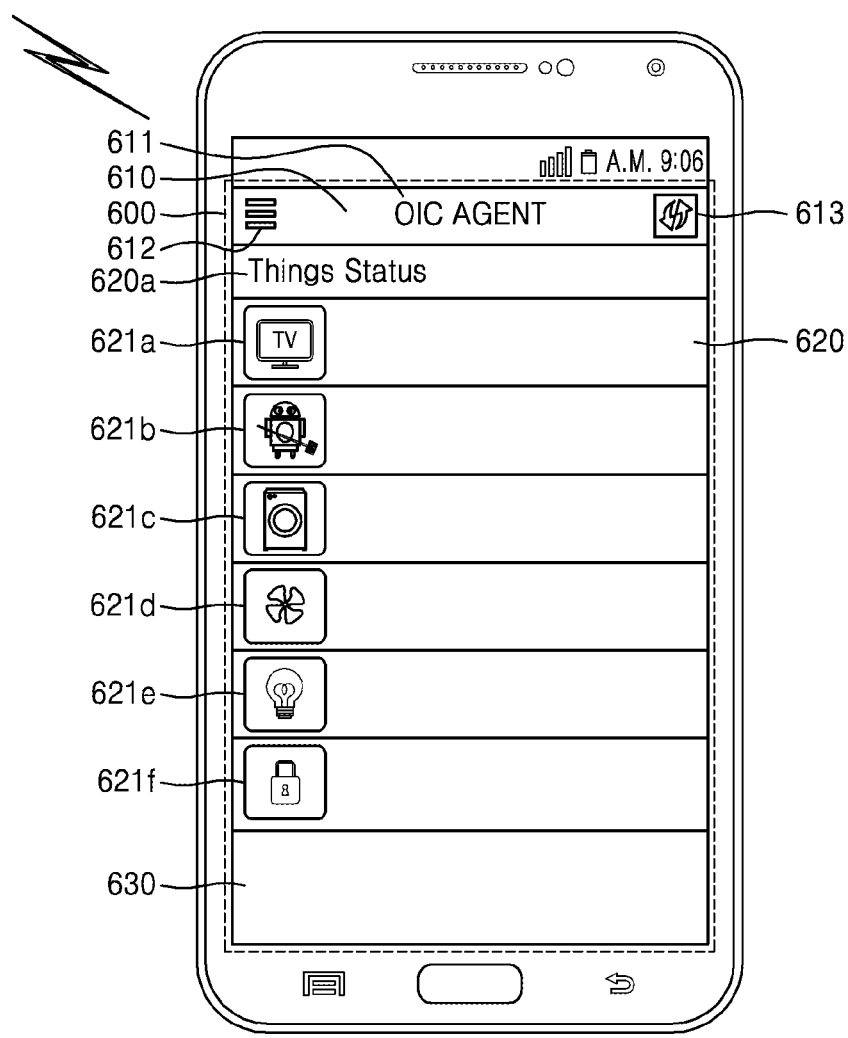

The electronic apparatus 100 may change (e.g., may turn on the power) the status of the display apparatus 201 that is one type of the external apparatus 200, via the server 300 and the application 600 (refer to FIG. 6C). Alternatively, instead of via the server 300, the electronic apparatus 100 may directly change (e.g., may turn on the power) the status of the display apparatus 201 that is one type of the external apparatus 200, via the application 600 (refer to FIG. 6C).

FIG. 2A is a block diagram of an electronic apparatus according to an embodiment of the present disclosure.

Referring to FIG. 2A, an electronic apparatus 100 may be connected by wire or wirelessly to the external apparatus 200 by using a mobile communication unit 120, a sub-communication unit 130, and a connector 165. The electronic apparatus 100 may include a mobile phone (not shown), a smartphone (not shown), a Moving Picture Experts Group phase 1 or phase 2 (MPEG-1 or MPEG-2) audio layer-3 (MP3) player, a video player, a tablet personal computer (PC), a wearable device that may be worn on a human body, an electronic interactive whiteboard, or the display apparatus 201. The display apparatus 201 may include an analog television (TV), a digital TV, a three-dimensional (3D) TV, a smart TV, a light-emitting diode (LED) TV, an organic LED (OLED) TV, a plasma TV, a monitor, a curved TV with a screen having a fixed curvature, a flexible TV, a bent TV with a screen having a fixed curvature, and/or a changeable-curvature TV capable of changing its current screen curvature in response to a received user input, but it will be obvious to one of ordinary skill in the art that examples of the display apparatus 201 are not limited thereto.

The electronic apparatus 100 may indicate an electronic apparatus having a touchscreen 190 and capable of transmitting or receiving data (or content) to or from an external source by using the mobile communication unit 120 or the sub-communication unit 130. The electronic apparatus 100 may indicate an electronic apparatus having an input pen and a touchscreen and capable of transmitting or receiving data (or content) to or from an external source by using the mobile communication unit 120 or the sub-communication unit 130. The electronic apparatus 100 may include an electronic apparatus capable of transmitting or receiving data (or content) to or from the external apparatus 200 via an interaction (e.g., a touch or a touch gesture) that is input to the touchscreen 190. The electronic apparatus 100 may indicate an electronic apparatus having a display unit (e.g., a display unit (not shown) that has a display panel, without a touch panel) and capable of transmitting or receiving data (or content) to or from an external source by using the mobile communication unit 120 or the sub-communication unit 130. The electronic apparatus 100 may have one or more touchscreens. Alternatively, the electronic apparatus 100 may have one touchscreen that is divided into a plurality of screens.

The electronic apparatus 100 includes a control unit 110, the mobile communication unit 120, the sub-communication unit 130, a multimedia unit 140, a camera 150, a global positioning system (GPS) 155, an input/output (I/O) unit 160, a sensor unit 170, a storage unit 175, and a power supplier 180. The electronic apparatus 100 includes the touchscreen 190 and a touchscreen controller 195.

The control unit 110 may include a processor 111, a read-only memory (ROM) 112 storing a control program for controlling the electronic apparatus 100, and a random-access memory (RAM) 113 that is used to store a signal or data received from an external source of the electronic apparatus 100 or is used as a storage domain for various tasks that are performed in the electronic apparatus 100.

The control unit 110 controls all operations of the electronic apparatus 100 and a flow of signals between components 120-195 of the electronic apparatus 100, and performs a data processing function. The control unit 110 controls power that is supplied from the power supplier 180 to the components 120-195. If a condition that is input or is set by a user and is stored is satisfied, the control unit 110 may execute an OS or an application stored in the storage unit 175 and may control at least one sensor of the sensor unit 170.

The processor 111 may include a graphics processing unit (GPU) (not shown) for processing graphics. The processor 111 may be embodied as a system on chip (SoC) including a core (not shown) and the GPU. The processor 111 may include a single core, a dual-core, a triple-core, a quad-core, or a multi-core. The processor 111, the ROM 112, and the RAM 113 may be connected to each other via a bus.

The control unit 110 may control the mobile communication unit 120, the sub-communication unit 130, the multimedia unit 140, the camera 150, the GPS 155, the I/O unit 160, the sensor unit 170, the storage unit 175, the power supplier 180, the touchscreen 190, and the touchscreen controller 195.

The control unit 110 according to the present embodiment may execute an application in the electronic apparatus 100 that is connectable to the external apparatus 200 and the server 300, may request the server 300 for external apparatus status information corresponding to the external apparatus 200, may display, on a screen of the application, the external apparatus status information received from the server 300, and may create a group action corresponding to the displayed external apparatus status information.

The control unit 110 may control the external apparatus status information to include an ID, a name, operation information, space information, environment information, available resource information, operation history information, error information, or the like of the external apparatus 200.

If a status of the electronic apparatus 100 is changed, the control unit 110 may request the server 300 for external apparatus status information that corresponds to the status change of the electronic apparatus 100.

If a status of the electronic apparatus 100 is changed, the control unit 110 may transmit, to the server 300, the external apparatus status information that corresponds to the status change of the electronic apparatus 100.

The control unit 110 may control a change in a location of the electronic apparatus 100 to be detected by the electronic apparatus 100 or by connection between the electronic apparatus 100 and the external apparatus 200.

If not connected to the server 300, the control unit 110 may request the external apparatus 200 for external apparatus status information about the external apparatus 200.

When the external apparatus status information is displayed on the screen of the application, the control unit 110 may control an icon to be displayed on the screen according to a priority order, wherein the icon corresponds to the external apparatus 200.

The control unit 110 may control another group action that is different from the group action to be created, in correspondence to a user's selection with respect to a selection box included in the displayed external apparatus status information.

The control unit 110 may control the created group action to include group action information including an ID of the external apparatus 200.

When the created group action is stored, the control unit 110 may control the stored group action to include group action information including a title of the group action.

When the created group action is stored, the control unit 110 may control at least one of visual feedback, acoustic feedback, and tactile feedback to be provided in correspondence to storage of the group action.

According to another embodiment, the control unit 110 may execute an application in the electronic apparatus 100 that is connectable to the external apparatus 200 and the server 300, and when a status of the electronic apparatus 100 is changed, the control unit 110 may request the server 300 for external apparatus status information about the external apparatus 200, may display, on a screen of the application, a recommended group action list that corresponds to the status change of the electronic apparatus 100 and is received from the server 300, may receive an input of selection of a recommended group action from the recommended group action list, and may execute the selected recommended group action.

The control unit 110 may transmit, to the server 300, a control packet that corresponds to the execution of the selected recommended group action.

In the present embodiment, the term "control unit" includes the processor 111, the ROM 112, and the RAM 113.

The mobile communication unit 120 may connect, according to control by the control unit 110, the electronic apparatus 100 to the external apparatus 200 by using one or more antennas via a mobile communication network. The mobile communication unit 120 may exchange a wireless signal for a voice call, a video call, a short message service (SMS), a multimedia message service (MMS), and data communication with a mobile phone (not shown), a smartphone (not shown), a tablet PC, or another electronic apparatus (not shown) that has a connectable telephone number.

The sub-communication unit 130 may include at least one of a wireless LAN 131 and a short-distance communication unit 132 (e.g., one of the wireless LAN 131 and the short-distance communication unit 132 or both the wireless LAN 131 and the short-distance communication unit 132).

The wireless LAN 131 may be connected to an AP, according to control by the control unit 110, by using wireless communication in a place where the AP is installed. The wireless LAN 131 may support a wireless LAN standard (IEEE802.11x) of the Institute of Electrical and Electronics Engineers (IEEE). The short-distance communication unit 132 may wirelessly connect, according to control by the control unit 110, the electronic apparatus 100 to the external apparatus 200 by using short-distance communication without the AP. The short-distance communication may include Bluetooth, BLE, IrDA, Wi-Fi, UWB, NFC, or the like.

The electronic apparatus 100 may include at least one selected from the mobile communication unit 120, the wireless LAN 131, and the short-distance communication unit 132, according to performance of the electronic apparatus 100. For example, the electronic apparatus 100 may include one of the mobile communication unit 120, the wireless LAN 131, and the short-distance communication unit 132, or a combination of the mobile communication unit 120, the wireless LAN 131, and the short-distance communication unit 132. The electronic apparatus 100 may be connected to an external accessory (e.g., a wireless speaker, a wireless headset, etc.) by using one of the mobile communication unit 120 and the sub-communication unit 130.

In the present embodiment, the term "communication unit" may include the mobile communication unit 120 and the sub-communication unit 130.

The multimedia unit 140 may include a broadcasting receiver 141, an audio reproducer 142, and/or a video reproducer 143. The broadcasting receiver 141 may receive, according to control by the control unit 110, a broadcasting signal (e.g., a TV broadcasting signal, a radio broadcasting signal, or a data broadcasting signal) and broadcasting additional information (e.g., an electronic program guide (EPG) or an electronic service guide (ESG)) that are broadcast from an external broadcasting station via an antenna (not shown). Also, the control unit 110 may reproduce the broadcasting signal and the broadcasting additional information by using the touchscreen 190, a video codec (not shown), and an audio codec (not shown).

The audio reproducer 142 may reproduce, according to control by the control unit 110, an audio source (e.g., an audio file with a file format of mp3, wma, ogg, or wav), which is pre-stored in the storage unit 175 of the electronic apparatus 100 or is received from an external source, by using an audio codec.

In the present embodiment, the audio reproducer 142 may reproduce, according to control by the control unit 110, acoustic feedback (e.g., an output of the audio source stored in the storage unit 175) by using an audio codec, which corresponds to creation or execution of a group action.

In the present embodiment, the audio reproducer 142 may reproduce, according to control by the control unit 110, acoustic feedback (e.g., an output of the audio source stored in the storage unit 175) by using an audio codec so as to correspond to a touch or a continuous touch movement detected via the touchscreen 190.

The video reproducer 143 may reproduce, according to control by the control unit 110, a digital video source (e.g., a video file with a file format of mpeg, mpg, mp4, avi, mov, mkv, or the like), which is pre-stored in the storage unit 175 of the electronic apparatus 100 or is received from an external source, by using a video codec. A multimedia application that is installable in the electronic apparatus 100 may reproduce an audio source or a video source by using an audio codec and/or a video codec. A multimedia application that is installable in the electronic apparatus 100 may reproduce a video source by using a hardware codec (not shown) and/or a software codec (not shown).

In the present embodiment, the video reproducer 143 may reproduce, according to control by the control unit 110, visual feedback (e.g., an output of the video source stored in the storage unit 175) by using a video codec, which corresponds to creation or execution of a group action.

It will be obvious to one of ordinary skill in the art that various types of video codecs and audio codecs capable of reproducing audio and video files having various file formats are produced and sold.

The multimedia unit 140 may include the audio reproducer 142 and the video reproducer 143 and may exclude the broadcasting receiver 141 so as to correspond to performance or a structure of the electronic apparatus 100. Also, the control unit 110 may include the audio reproducer 142 or the video reproducer 143 of the multimedia unit 140.

In the present embodiment, the term "audio codec" may include one or more audio codecs. In the present embodiment, the term "video codec" may include one or more video codecs.

The camera 150 may include at least one of a first camera 151 of a front surface 100a (refer to FIG. 1) and a second camera 152 of a rear surface (not shown), which capture a still mage or a moving picture, according to control by the control unit 110. The camera 150 may include one or both of the first camera 151 and the second camera 152. The first camera 151 or the second camera 152 may include an auxiliary light source (e.g., a flash 153) that provides an amount of light for the capturing operation.

The control unit 110 may capture a 3D still image or a 3D moving picture by using the first camera 151 of the front surface 100a and an additional camera (e.g., a third camera (not shown)) that is positioned adjacent to the first camera 151 (e.g., a distance between the first camera 151 and the additional camera may be greater than about 30 mm and less than about 80 mm) Also, the control unit 110 may capture a 3D still image or a 3D moving picture by using the second camera 152 of the rear surface and an additional camera (e.g., a fourth camera (not shown)) that is positioned adjacent to the second camera 152 (e.g., a distance between the second camera 152 and the additional camera may be greater than about 30 mm and less than about 80 mm) Also, the first and second cameras 151 and 152 may capture a wide angle image, a telephoto image, and a macro image by using an additional lens (not shown) that is detachable from an additional adaptor (not shown).

The GPS 155 periodically receives signals (e.g., orbit information, time information, and a navigation message of each of a plurality of GPS satellites (not shown) from among the GPS satellites orbiting Earth. In an outdoor environment, the electronic apparatus 100 may calculate locations of the GPS satellites and the electronic apparatus 100 by using the signals received from the GPS satellites, and may calculate a distance between each of the GPS satellites and the electronic apparatus 100 by using a time difference between transmission and reception. The GPS 155 may calculate a location, a time, or a movement speed of the electronic apparatus 100 by using triangulation. An additional GPS satellite may be required for orbit correction or time correction. In an indoor environment where signals are received by the GPS 155 from the GPS satellites, the electronic apparatus 100 may calculate a location, a time, or a movement speed of the electronic apparatus 100.

In the indoor environment, the electronic apparatus 100 may detect the location or the movement speed of the electronic apparatus 100 by using a wireless AP (not shown). In the indoor environment, the location of the electronic apparatus 100 may be detected by using a cell-ID method using an ID of the wireless AP, by using an enhanced cell-ID method using the ID of the wireless AP and a received signal strength indicator (RSSI), or by using an angle of arrival (AoA) method using an angle of a signal that is transmitted from an AP to the electronic apparatus 100.

The electronic apparatus 100 may detect the location or the movement speed of the electronic apparatus 100 in the indoor environment by using a wireless beacon (not shown). It will be obvious to one of ordinary skill in the art that the indoor location of the electronic apparatus 100 may also be detected by using one of various methods other than the aforementioned methods.

The I/O unit 160 may include at least one of one or more buttons 161, a microphone 162, a speaker 163, a vibration motor 164, the connector 165, a keypad 166, and an input pen 167.

Referring to FIG. 1, the one or more buttons 161 include a home button 161a, a menu button 161b, and a back button 161c that are positioned at a lower portion of the front surface 100a. The one or more buttons 261 may also include a power/lock button 161d and one or more volume buttons 161e that are positioned at a side surface 100b. Also, the one or more buttons 161 of the electronic apparatus 100 may include the home button 161a, the power/lock button 161d, and the one or more volume buttons 161e. The one or more buttons 161 of the electronic apparatus 100 may be embodied as a physical button. The one or more buttons 161 of the electronic apparatus 100 may also be embodied as a touch button at a bezel of an external side of the touchscreen 190. Also, the one or more buttons 161 of the electronic apparatus 100 may be displayed as a text, an image, or an icon on the touchscreen 190.

The microphone 162 may receive a voice or a sound from an external source and may generate an electrical signal, according to control by the control unit 110. The electrical signal generated by the microphone 162 may be converted via an audio codec and may be stored in the storage unit 175 or may be output via the speaker 163. The microphone 162 may be positioned at one or more places on the front surface 100a, the side surface 100b, and the rear surface of the electronic apparatus 100. Alternatively, the microphone 162 may be positioned at one or more places on the side surface 100b of the electronic apparatus 100.

The speaker 163 may externally output, according to control by the control unit 110, sounds that correspond to various signals (e.g., a wireless signal, a broadcasting signal, an audio source signal, a video file, or an image capturing signal) of the mobile communication unit 120, the sub-communication unit 130, the multimedia unit 140, or the camera 150 by using an audio codec.

The speaker 163 may output a sound (e.g., a touch manipulation sound that corresponds to inputting a telephone number or an image-capturing button manipulation sound) that corresponds to a function performed by the electronic apparatus 100. One or more speakers 163 may be positioned at the front surface 100a, the side surface 100b, and the rear surface of the electronic apparatus 100. Referring to FIGS. 1 and 2A, a plurality of speakers 163 may be positioned at the front surface 100a of the electronic apparatus 100. Alternatively, the speakers 163 may be positioned at each of the front surface 100a and the rear surface of the electronic apparatus 100. Alternatively, the speaker 163 may be positioned at the front surface 100a of the electronic apparatus 100 and a plurality of speakers including the speaker and an additional speaker (not shown) may be positioned at the rear surface of the electronic apparatus 100. Alternatively, the speakers 163 may be positioned at the side surface 100b. The electronic apparatus 100 having an additional speaker (not shown) positioned at its side surface 100b may provide, to a user, a sound effect different from that of an electronic apparatus (not shown) having speakers positioned at its front surface 100a and rear surface.

In the present embodiment, the speaker 163 may output, according to control by the control unit 110, acoustic feedback that corresponds to creation or execution of a group action.

The vibration motor 164 may convert, according to control by the control unit 110, an electrical signal into a mechanical vibration. The vibration motor 164 may include a linear vibration motor, a bar-type vibration motor, a coin-type vibration motor, or a piezoelectric element vibration motor. For example, when a voice call request is received from another portable apparatus (not shown), the vibration motor 164 of the electronic apparatus 100 in a vibration mode may operate according to control by the control unit 110. The electronic apparatus 100 may include one or more vibration motors 164. Also, the vibration motor 164 may vibrate the electronic apparatus 100 or may vibrate a portion of the electronic apparatus 100.

In the present embodiment, the vibration motor 164 may output, according to control by the control unit 110, tactile feedback that corresponds to creation or execution of a group action. According to a control command by the control unit 110, the vibration motor 164 may provide various tactile feedback (e.g., intensity of a vibration, duration of the vibration, etc.) that are pre-stored or are received from an external source.

The connector 165 may be used as an interface for connecting the electronic apparatus 100 to an external apparatus (not shown) or a power source (not shown). According to control by the control unit 110, the electronic apparatus 100 may transmit data stored in the storage unit 175 to the external apparatus (not shown) via a wire cable connected to the connector 165 or may receive data from the external apparatus (not shown). The electronic apparatus 100 may receive power from the power source (not shown) or may charge a battery (not shown) via a wire cable connected to the connector 165. The electronic apparatus 100 may be connected to an external accessory (e.g., a speaker (not shown), a keyboard dock (not shown), etc.) via the connector 165.

The keypad 166 may receive, from a user, an input for controlling the electronic apparatus 100. The keypad 166 may include a physical keypad (not shown) that is arranged at the front surface 100a of the electronic apparatus 100, a virtual keypad (not shown) that is displayed on the touchscreen 190, and a physical keypad (not shown) that is connectable by wire or wirelessly. It will be obvious to one of ordinary skill in the art that the physical keypad (not shown) that is arranged at the front surface 100a of the electronic apparatus 100 may be omitted, according to performance or a structure of the electronic apparatus 100.

The input pen 167 may be used to touch or select an object (e.g., a menu, a text, an image, a video, a diagram, an icon, and a shortcut icon) displayed on a home screen 191 of the touchscreen 190 of the electronic apparatus 100 or screens (e.g., a memo screen, a notepad screen, a calendar screen, etc.) of writing/drawing applications. The input pen 167 may be used to touch or select content (e.g., a text file, an image file, an audio file, a video file, or a webpage) displayed on the touchscreen 190 of the electronic apparatus 100 or on the screens (e.g., a memo screen, a notepad screen, a calendar screen, etc.) of the writing/drawing applications. Also, the input pen 167 may be used to perform handwriting on the screen (e.g., the memo screen) of the writing application or may perform drawing, painting, or sketching on the screen (e.g., a canvas screen) of the drawing application displayed on the touchscreen 190 of the electronic apparatus 100.

The input pen 167 may be used to input a text or the like by touching it on the touchscreen 190 or a virtual keypad displayed on the touchscreen 190 that is a capacitive-type touchscreen, a resistive-type touchscreen, or an electromagnetic resonance (EMR)-type touchscreen. The input pen 167 may include a stylus pen or a haptic pen (not shown) having an embedded vibration device (e.g., an actuator or a vibration motor) that vibrates. Also, the input pen 167 may operate (e.g., vibrate) the vibration device, according to control information that is received by the electronic apparatus 100 and sensing information that is detected by a sensor (e.g., an acceleration sensor (not shown)) embedded in the input pen 167.

When the input pen 167 is withdrawn from an insertion hole (not shown), the control unit 110 may execute a preset writing/drawing application and may display a screen (not shown) of the writing/drawing application on the touchscreen 190.

The input pen 167 may include a finger of the user. For example, drawing may be input, by using the finger of the user, to an application that is displayed on a capacitive-type touchscreen or a resistive-type touchscreen.

In a case where writing or drawing is input, by using the finger of the user, to the application that is displayed on the capacitive-type touchscreen or the resistive-type touchscreen, the control unit 110 may detect a touch by a finger by using the touchscreen 190 and the touchscreen controller 195.

It will be obvious to one of ordinary skill in the art that a shape (e.g., a round cross-section or a polygonal cross-section) of the insertion hole of the electronic apparatus 100 or a structure of the input pen 167 of the electronic apparatus 100 (e.g., a battery (not shown) is included in the input pen 167) may be changed, according to performance or a structure of the electronic apparatus 100.

The sensor unit 170 may include one or more sensors that detect a status of the electronic apparatus 100. For example, the sensor unit 170 may include a proximity sensor 171 that detects whether the user approaches the electronic apparatus 100, an illumination sensor 172 that detects an amount of light around the electronic apparatus 100, and a gyroscope sensor 173 that detects a direction of the electronic apparatus 100 by using rotational inertia. The sensor unit 170 may include an acceleration sensor (not shown) that detects acceleration of three axes (e.g., an X-axis, a Y-axis, and a Z-axis) that are applied to the electronic apparatus 100, a gravity sensor (not shown) that detects a direction of gravitational pull, or an altimeter that detects an altitude by measuring atmospheric pressure.

The sensor unit 170 may measure each of motional acceleration and gravitational acceleration of the electronic apparatus 100. If the electronic apparatus 100 does not move, the sensor unit 170 may measure the gravitational acceleration. For example, when the front surface 100a of the electronic apparatus 100 faces upward, the gravitational acceleration may be in a positive (+) direction, and when the rear surface of the electronic apparatus 100 faces upward, the gravitational acceleration may be in a negative (−) direction. The sensor unit 170 may further include a fingerprint sensor (not shown) that detects a fingerprint of a user, or a cardiac sensor (not shown) that detects a heartbeat of the user.

The one or more sensors included in the sensor unit 170 detect a status of the electronic apparatus 100, create an electrical signal corresponding to a detection result, and transmit the electrical signal to the control unit 110. It will be obvious to one of ordinary skill in the art that the one or more sensors included in the sensor unit 170 may be added or omitted, according to performance of the electronic apparatus 100.

The storage unit 175 may store, according to control by the control unit 110, signals or data that is input and output so as to correspond to operations of the mobile communication unit 120, the sub-communication unit 130, the multimedia unit 140, the camera 150, the GPS 155, the I/O unit 160, the sensor unit 170, the touchscreen 190, and the touchscreen controller 195. The storage unit 175 may store a control program for a control operation of the electronic apparatus 100 or the control unit 110, GUIs related to applications that are received from a manufacturer or an external source, images for providing the GUIs, user information, documents, databases, or related data.

In the present embodiment, the storage unit 175 may store apparatus information of the electronic apparatus 100, apparatus information of the external apparatus 200, or apparatus information of the server 300.

The storage unit 175 may store external apparatus status information, a recommended group action, and a recommended group action list that are received from the server 200.

The storage unit 175 may store a created group action or another group action that is created by changing a group action.

The storage unit 175 may store a control packet corresponding to execution of the group action.

The storage unit 175 may store a plurality of touch location information.

The storage unit 175 may store user-recognizable visual feedback (e.g., a video source, etc.) that is output to the touchscreen 190, user-recognizable acoustic feedback (e.g., a sound source, etc.) that is output from the speaker 163, and user-recognizable tactile feedback (e.g., a haptic pattern, etc.) that is output by the vibration motor 164, which correspond to creation or execution of a group action.

The storage unit 175 may store a feedback provision time (e.g., 300 ms) of feedback provided to the user.

In the present embodiment, the term "storage unit" includes the storage unit 175, the ROM 112 and the RAM 113 that are included in the control unit 110, or a memory card (e.g., a micro secure digital (SD) card (not shown) or a memory stick (not shown)) mounted to the electronic apparatus 100. The storage unit 175 may include a non-volatile memory, a volatile memory, a hard disk drive (HDD), or a solid-state drive (SSD).

The power supplier 180 supplies, according to control by the control unit 110, power to the internal elements 120 through 175 in the electronic apparatus 100. The power supplier 180 may supply, according to control by the control unit 110, power to the electronic apparatus 100, wherein the power is input from an external power source (not shown) via a wire cable (not shown) connected to the connector 165. The power supplier 180 may supply, according to control by the control unit 110, power to one or more batteries (not shown) and may charge the one or more batteries. The one or more batteries may be arranged between the touchscreen 190 at the front surface 100a and the rear surface.

The power supplier 180 may wirelessly charge (e.g., by magnetic resonance, electromagnetic waves, or magnetic induction) the one or more batteries, according to control by the control unit 110.

The touchscreen 190 includes a touch panel (not shown) for receiving a touch input, and a display panel (not shown) for a screen display. The touchscreen 190 may provide, to the user, GUIs that correspond to various services (e.g., a voice call, a video call, data transmission, broadcasting reception, an image-capturing operation, video viewing, execution of an application, etc.). The touchscreen 190 transmits, to the touchscreen controller 195, an analog signal that corresponds to a single touch or multiple touches that are input via the home screen 191 or a GUI. The touchscreen 190 may receive an input of the single touch or the multiple touches via a body part (e.g. a finger or a thumb) of the user, or the input pen 167.

The display panel includes a plurality of pixels and displays an image by using the pixels. For example, the display panel may include a liquid crystal display (LCD) panel, an OLED panel, an LED panel, or the like. The display panel may display various operational statuses of the electronic apparatus 100, and various images and a plurality of objects that occur according to executing an application or a service.

In the present embodiment, the term "touch" includes both direct and non-direct contacts between the body part of the user and the touchscreen 190 or between the input pen 167 and the touchscreen 190. For example, the non-direct contact may include hovering the body part of the user or the input pen 167 a distance equal to or less than 50 nm from the touchscreen 190. It will be obvious to one of ordinary skill in the art that a distance of the non-direct contact that is detectable by the touchscreen 190 may be changed, according to performance or a structure of the electronic apparatus 100.

The touchscreen 190 may be embodied as a resistive-type touchscreen, a capacitive-type touchscreen, an infrared-type touchscreen, or an acoustic wave-type touchscreen.

The touchscreen 190 may be embodied as an EMR-type touchscreen. The EMR-type touchscreen may further include a separate EMR-type touch panel (not shown) so as to receive an input via an input pen (not shown) having a resonance circuit that resonates with an EMR-type loop coil.

In the present embodiment, the touchscreen 190 may display, according to control by the control unit 110, visual feedback corresponding to creation or execution of a group action.

The touchscreen controller 195 converts the analog signal, which corresponds to the single touch or the multiple touches received via the touchscreen 190, into a digital signal and transmits the digital signal to the control unit 110. The control unit 110 may calculate coordinates of X and Y-axes corresponding to a touch location on the touchscreen 190, by using the digital signal received from the touchscreen controller 195.

The control unit 110 may control the touchscreen 190 by using the digital signal received from the touchscreen controller 195. For example, in response to the input touch, the control unit 110 may display a shortcut icon (e.g., an icon 193a shown in FIG. 1) from shortcut icons (e.g., icons 193a, 193b, 193c, 193d, 193e, 193f, 193g, 193h, and 193i) that are displayed on the touchscreen 190, or may execute an application (e.g., a call application) corresponding to a selected shortcut icon (e.g., the icon 193a shown in FIG. 1) and may display a screen of the application on the touchscreen 190.

The touchscreen controller 195 may be arranged as one touchscreen controller 195 or a plurality of touchscreen controllers 195. The touchscreen controller 195 may be included in the control unit 110 so as to correspond to performance or a structure of the electronic apparatus 100.

The touchscreen controller 195 converts an analog signal into a digital signal and transmits the digital signal to the control unit 110, wherein the analog signal corresponds to a touch received via the EMR-type touchscreen and is different from the analog signal that corresponds to the signal touch or the multiple touches and is received via the touchscreen 190. The control unit 110 may calculate X and Y coordinates corresponding to a touch location on the EMR-type touchscreen, by using the digital signal received from the touchscreen controller 195. Also, in the EMR-type touchscreen, an EMR-type touchscreen controller (not shown) may be used.

While the electronic apparatus 100 shown in FIGS. 1 and 2A has one touchscreen, one or more embodiments are not limited thereto and the electronic apparatus 100 may have a plurality of touchscreens. The plurality of touchscreens may be respectively arranged in housings (not shown) and may be connected to each other by using hinges (not shown). A plurality of flexible touchscreens may be arranged in one housing (not shown). The plurality of flexible touchscreens may include one display panel and a plurality of touch panels. Alternatively, the plurality of flexible touchscreens may include one touch panel corresponding to a plurality of display panels. Alternatively, the plurality of flexible touchscreens may include a plurality of touch panels corresponding to a plurality of display panels.

It will be obvious to one of ordinary skill in the art that at least one of the elements of the electronic apparatus 100 shown in FIG. 2A may be removed or at least one element may be added, according to performance of the electronic apparatus 100.

FIG. 2B is a block diagram of an external apparatus according to an embodiment of the present disclosure.

Referring to FIG. 2B, an external apparatus 200 may be connected to the electronic apparatus 100, another external apparatus, or the server 300 by wire or wirelessly by using a communication unit 230.

The external apparatus 200 may include a display apparatus 201, a robotic vacuum cleaner 202, a washing machine 203, an air conditioner 204, a lamp 205, or an automatic door lock 206. The external apparatus 200 may include a curtain (not shown), a sensor including a temperature sensor (not shown), a window (not shown), a refrigerator (not shown), an electric fan (not shown), a garage (not shown), a home theater (not shown), a wireless sound-bar (not shown), a wireless headset (not shown), wireless earphones (not shown), a wireless headphone (not shown), a monitor (not shown), a wearable device (not shown), a bookmark (an electronic bookmark) (not shown), a mobile phone (not shown), or a smartphone (not shown). The external apparatus 200 indicates an apparatus that may be connected to the electronic apparatus 100 by using the communication unit 230. The external apparatus 200 may detect, according to control by a control unit 210, an interior status or an exterior status of the external apparatus 200 by using a function unit 260 or a sensor unit 270, and may transmit information about the detected status to the electronic apparatus 100 by using the communication unit 230. The external apparatus 200 may include a combination of the apparatuses 201, 202, 203, 204, 205, and 206.

The external apparatus 200 may perform a unique function of the external apparatus 200. For example, the unique function of the external apparatus 200 may include a broadcasting receiving function of a TV, an automatic cleaning function of a robotic vacuum cleaner, a washing function of a washing machine, a cooling function of an air conditioner, a lighting function of a lamp, a lock function of an automatic door lock, cooling and freezing functions of a refrigerator, an audio output function of an audio apparatus, or the like. It will be obvious to one of ordinary skill in the art that the unique function of the external apparatus 200 is not limited to the aforementioned functions.

The external apparatus 200 may include the control unit 210, the communication unit 230, the function unit 260, the sensor unit 270, a storage unit 275, a power supply 280, and a display unit 290.

The control unit 210 may include a processor 211, a ROM 212 that stores a control program for controlling the external apparatus 200, and a RAM 213 that is used to store a signal or data received from an external source of the external apparatus 200 or is used as a storage domain for various tasks that are performed by the external apparatus 200.

The control unit 210 controls all operations of the external apparatus 200 and a flow of signals between components 230-290 of the apparatus 200, and performs a data processing function.

The control unit 210 controls power that is supplied from the power supplier 280 to the components 230-290. If a condition that is input or is set by a user and is stored is satisfied, the control unit 210 may execute an OS or an application stored in the storage unit 275 and may control at least one sensor of the sensor unit 270.

The processor 211 may include a GPU (not shown) for processing graphics. The processor 211 may be embodied as a SoC including a core (not shown) and the GPU. The processor 211 may include a single core, a dual-core, a triple-core, a quad-core, or a multi-core. The processor 211, the ROM 212, and the RAM 213 may be connected to each other via a bus.

The control unit 210 may control the communication unit 230, the function unit 260, the sensor unit 270, the storage unit 275, the power supplier 280, and the display unit 290.

In the present embodiment, the control unit 210 may detect a status and a status change of the external apparatus 200 by using the sensor unit 270 and a separate sensor (not shown).

The control unit 210 may control the communication unit 230 to transmit, to the server 300, external apparatus status information that corresponds to the status change detected by using server apparatus information stored in the storage unit 275.

The control unit 210 may receive, from the server 300, a control packet corresponding to execution of a group action by using the communication unit 230.

The control unit 210 may store, in the storage unit 275, a control packet corresponding to the server apparatus information, the external apparatus status information, or information about execution of the group action.

In the present embodiment, the term "the control unit 210 of the external apparatus 200" includes the processor 211, the ROM 212, and the RAM 213.

In the present embodiment, the control unit 210 of the external apparatus 200 may indicate a control unit of each of the apparatuses 201, 202, 203, 204, 205, and 206.

The external apparatus 200 may include a mobile communication unit (not shown). The mobile communication unit of the external apparatus 200 may exchange a wireless signal for a voice call, a video call, a SMS, a MMS, and data communication with a mobile phone (not shown), a smartphone (not shown), a tablet PC, a tablet device, or another electronic apparatus (not shown) that has a connectable telephone number. The communication unit 230 may include at least one of a wireless LAN 231 and a short-distance communication unit 232. For example, the communication unit 230 may include one of the wireless LAN 231 and the short-distance communication unit 232 or may include both the wireless LAN 231 and the short-distance communication unit 232.

The wireless LAN 231 may be connected to an AP, according to control by the control unit 210, by using wireless communication in a place where the AP is installed. The wireless LAN 231 supports a wireless LAN standard (IEEE802.11x) of the IEEE. The short-distance communication unit 232 may wirelessly connect, according to control by the control unit 210, the external apparatus 200 to the electronic apparatus 100 by using short-distance communication without the AP. The short-distance communication may include Bluetooth, BLE, IrDA, Wi-Fi, UWB, NFC, or the like.

The communication unit 230 may transmit, according to control by the control unit 210, environment information or status information detected (or stored) by the function unit 260 to the server 300. The communication unit 230 may periodically (e.g., 1 sec, changeable) transmit, according to control by the control unit 210, the environment information or the status information detected (or stored) by the function unit 260 to the server 300. The communication unit 230 may receive, from one of the server 300 and the electronic apparatus 100, a request to transmit the detected (or stored) environment information or status information.

The external apparatus 200 may be connected to another external apparatus (e.g., a wireless speaker, a wireless headset, etc.) by using the communication unit 230.

A multimedia unit (not shown) may include a broadcasting receiver, an audio reproducer, and/or a video reproducer. The broadcasting receiver 241 may receive, according to control by the control unit 210, a broadcasting signal (e.g., a TV broadcasting signal, a radio broadcasting signal, or a data broadcasting signal) and broadcasting additional information (e.g., an EPG or an ESG) that are broadcast from an external broadcasting station via an antenna (not shown). Also, the control unit 210 may reproduce the broadcasting signal and the broadcasting additional information by using a touchscreen (not shown), a video codec (not shown), and an audio codec (not shown).

The audio reproducer 242 may reproduce, according to control by the control unit 210, an audio source (e.g., an audio file with a file format of mp3, wma, ogg, or way), which is pre-stored in the storage unit 275 of the external apparatus 200 or is received from an external source, by using an audio codec.

In the present embodiment, the audio reproducer 242 may reproduce, according to control by the control unit 210, acoustic feedback (e.g., an output of the audio source stored in the storage unit 275) by using an audio codec so as to correspond to movement of the external apparatus 200, and content output to the external apparatus 200.

The video reproducer 243 may reproduce, according to control by the control unit 210, a digital video source (e.g., a video file with a file format of mpeg, mpg, mp4, avi, mov, mkv, or the like), which is pre-stored in the storage unit 275 of the external apparatus 200 or is received from an external source, by using a video codec. A multimedia application that is installable in the external apparatus 200 may reproduce an audio source or a video file by using an audio codec and/or a video codec. A multimedia application that is installable in the external apparatus 200 may reproduce a video file by using a hardware codec (not shown) and/or a software codec (not shown).

In the present embodiment, the video reproducer 243 may reproduce, according to control by the control unit 210, visual feedback (e.g., an output of the video source stored in the storage unit 275) by using a video codec so as to correspond to movement of the external apparatus 200 and a content output to the external apparatus 200.

It will be obvious to one of ordinary skill in the art that various types of video codecs and audio codecs are produced and sold.

The multimedia unit 240 may include the audio reproducer 242 and the video reproducer 243 and may exclude the broadcasting receiver 241 so as to correspond to performance or a structure of the external apparatus 200. Also, the audio reproducer 242 or the video reproducer 243 of the multimedia unit 240 may be included in the control unit 210.

In the present embodiment, the term "audio codec" may include one or more audio codecs. In the present embodiment, the term "video codec" may include one or more video codecs.

The external apparatus 200 may include at least one of a first camera (not shown) of a front surface and a second camera (not shown) of a rear surface, which capture a still mage or a moving picture, according to control by the control unit 210. For example, the external apparatus 200 may include one or both of the first camera and the second camera.

The external apparatus 200 may include a GPS (not shown). The GPS periodically receives a plurality of pieces of information (e.g., information about an accurate location and time of a GPS satellite from which a signal is receivable by the external apparatus 200) from among a plurality of GPS satellites (not shown) orbiting Earth.

The function unit 260 may allow the external apparatus 200 to perform a function that is different from those of other apparatuses. The function may include a broadcasting receiving function of a TV, an automatic cleaning function of a robotic vacuum cleaner, a washing function of a washing machine, a cooling function of an air conditioner, a lighting function of a lamp, a lock function of an automatic door lock, cooling and freezing functions of a refrigerator, an audio output function of an audio apparatus, or the like.

When the external apparatus 200 is the display apparatus 201, the function unit 260 may display, according to control by the control unit 210, a video included in a broadcasting signal that is received via a display panel (not shown) and a tuner (not shown), on a screen of the display apparatus 201. The function unit 260 may output, according to control by the control unit 210, audio that is included in the received broadcasting signal, via a speaker (not shown).

When the external apparatus 200 is the robotic vacuum cleaner 202, the function unit 260 may suck up, according to control by the control unit 210, dust from a floor via a motor (not shown) and a filter (not shown). The function unit 260 may include one or more wheels (not shown) for avoiding peripheral obstacles and allowing autonomous driving thereof.

When the external apparatus 200 is the washing machine 203, the function unit 260 may wash, according to control by the control unit 210, by using a lid (not shown), a laundry tub (not shown), and a motor (not shown), clothes that are put in the laundry tub. The function unit 260 may include a vibration reducing member (e.g., a balancer) that reduces vibration of the laundry tub that vibrates due to rotation.

When the external apparatus 200 is the air conditioner 204, the function unit 260 may lower, according to control by the control unit 210, a surrounding air temperature by using a compressor (not shown), a condenser (not shown), an expansion valve (not shown), and an evaporator (not shown) that configure a refrigerating cycle. The function unit 260 may include a refrigerant (not shown) and a tube (not shown) through which the refrigerant moves. When the external apparatus 200 is a refrigerator (not shown), the refrigerating cycle may also be applied to the refrigerator.

When the external apparatus 200 is the lamp 205, the function unit 260 may turn on or off a bulb mounted in a socket or may change brightness of the bulb, according to control by the control unit 210.

When the external apparatus 200 is the automatic door lock 206, the function unit 260 may selectively lock or unlock a door, according to control by the control unit 210. The function unit 260 may output, according to control by the control unit 210, a warning sound via a speaker (not shown) in an abnormal circumstance.

When the external apparatus 200 is an audio apparatus (not shown), the function unit 260 may output, according to control by the control unit 210, audio streaming that is received via the communication unit 230. The function unit 260 may output audio, according to control by the control unit 210.

When the external apparatus 200 is a sensor (not shown), the function unit 260 may perform a unique function of the sensor. Environment information (e.g., a temperature, a tilt, a movement speed, etc.) or status information (e.g., a power on status, a standby status, an operational status, etc.), which is detected by the function unit 260, may be stored in the storage unit 275. The sensor may transmit, according to control by the control unit 210, the environment information or the status information to the electronic apparatus 100 by using the communication unit 230.

If the sensor is an illumination sensor, the function unit 260 may detect ambient illumination. If the sensor is a temperature sensor, the function unit 260 may detect a temperature. If the sensor is a humidity sensor, the function unit 260 may detect an ambient humidity. If the sensor is an acceleration sensor, the function unit 260 may detect acceleration of three axes (e.g., an X-axis, a Y-axis, and a Z-axis). If the sensor is a gyroscope sensor, the function unit 260 may detect a direction by using rotational inertia. It will be obvious to one of ordinary skill in the art that the function unit 260 may also be embodied using one of various sensors other than the aforementioned sensors.

The sensor unit 270 may detect, according to control by a control unit 210, an interior status or an exterior status of the external apparatus 200. The sensor unit 270 may detect, according to control by a control unit 210, an interior status change or an exterior status change of the external apparatus 200. When the external apparatus 200 is not a sensor, the external apparatus 200 may include both the function unit 260 and the sensor unit 270. When the external apparatus 200 is the sensor, the sensor unit 270 of the external apparatus 200 may be replaced by the function unit 260.

The storage unit 275 may store, according to control by the control unit 210, signals or data that is input and output so as to correspond to operations of the communication unit 230, the function unit 260, the sensor unit 270, and the display unit 290. The storage unit 275 may store a control program for a control operation of the external apparatus 200 or the control unit 210, GUIs related to applications that are received from a manufacturer or an external source, images for providing the GUIs, user information, documents, databases, or related data.

The storage unit 275 may store, according to control by the control unit 210, data related to an operation of the function unit 260, environment information (e.g., a temperature, acceleration, illumination, etc.) detected by the sensor unit 270, or status information (e.g., a power on status, an operational status, etc.) detected by the sensor unit 270.

The storage unit 275 may store the control packet corresponding to the server apparatus information, the external apparatus status information, or information about execution of the group action.

The power supplier 280 may supply, by a control of the control unit 210, a power to components 230-290 in the external apparatus 200. The power supplier 280 may supply, by a control of the control unit 210, a power to the external apparatus 200, wherein the power is received from an external power source (not shown) via a wire cable (not shown) connected to a connector (not shown). The power supplier 280 may supply, according to control by the control unit 210, power to one or more batteries (not shown) and may charge the one or more batteries.

The power supplier 280 may wirelessly charge (e.g., by magnetic resonance, electromagnetic waves, or magnetic induction) the one or more batteries, according to control by the control unit 210.

The display unit 290 may provide, by a control of the control unit 210, GUIs that correspond to various services (e.g., a voice call, a video call, data transmission, broadcasting reception, an image-capturing operation, video viewing, execution of an application, etc.) to a user. A display panel of the display unit 290 includes a plurality of pixels and displays an image by using the pixels. For example, the display panel may include an LCD panel, an OLED panel, an LED panel, or the like. The display panel may display various operational statuses of the external apparatus 200, and various images and a plurality of objects that occur according to executing an application or a service.

The display unit 290 may include a touchscreen (not shown) including the display panel and a touch panel (not shown). The touchscreen may be embodied as a resistive-type touchscreen, a capacitive-type touchscreen, an infrared-type touchscreen, or an acoustic wave-type touchscreen.

In the present embodiment, the display unit 290 may output, according to control by the control unit 210, visual feedback that corresponds to execution of a group action.

Referring to FIGS. 1, 2A, and 2B, the electronic apparatus 100 is different from the external apparatus 200, but it will be obvious to one of ordinary skill in the art that the electronic apparatus 100 and the external apparatus 200 are embodied as a plurality of same-type electronic apparatuses (e.g., tablet apparatuses 1 and 2).

It will be obvious to one of ordinary skill in the art that at least one of the elements of the external apparatus 200 shown in FIG. 2B may be removed or at least one element may be added, according to performance of the external apparatus 200.

FIG. 2C is a block diagram of a server according to an embodiment of the present disclosure.

Referring to FIG. 2C, a server 300 is wirelessly connected to at least one of the electronic apparatus 100 and the external apparatus 200 by using a communication unit 330. The server 300 may request the external apparatus 200 for status information. The server 300 may receive the status information from the external apparatus 200. The server 300 may receive, from the electronic apparatus 100, a request to transmit the status information. The server 300 may transmit the status information to the electronic apparatus 100. In the present embodiment, the server 300 may indicate a computing apparatus capable of storing the received status information and exchanging status information with the electronic apparatus 100 and the external apparatus 200. The server 300 may include a gateway or a home server. A refrigerator or a display apparatus may function as the gateway.

The server 300 may include a control unit 310, the communication unit 330, a storage unit 375, a power supply 380, and a display unit 390.

The control unit 310 may include a processor 311. The control unit 310 may include the processor 311 and a ROM 312 storing a control program for controlling the server 300. The control unit 310 may include the processor 311, the ROM 312, and a RAM 313 that is used to store a signal or data received from an external source of the server 300 or is used as a storage domain for various tasks that are performed in the server 300.

The control unit 310 controls power that is supplied from the power supply 380 to components 330-390.

The control unit 310 may control the communication unit 330, the storage unit 375, the power supply 380, and the display unit 390.

The control unit 310 may receive external apparatus status information from the external apparatus 200 by using the communication unit 330. The control unit 310 may transmit the external apparatus status information to the electronic apparatus 100 by using the communication unit 330.

The control unit 310 may create a group action, a recommended group action, and a recommended group action list by using the external apparatus status information received by using the communication unit 330, and may transmit the group action, the recommended group action, and the recommended group action to the electronic apparatus 100.

The control unit 310 may analyze, by using management software, the external apparatus status information received by using the communication unit 330, and may transmit the recommended group action or the recommended group action to the electronic apparatus 100 by using the communication unit 330.

The control unit 310 may receive a control packet corresponding to execution of the group action, from the electronic apparatus 100 and by using the communication unit 330.

The control unit 310 may transmit the received control packet to the external apparatus 200 by using the communication unit 330.

The control unit 310 may receive, by using the communication unit 330, external apparatus status information that is changed so as to correspond to the transmitted control packet.

The communication unit 330 may wirelessly connect the electronic apparatus 100 and the external apparatus 200, according to control of the control unit 310. The communication unit 330 may include at least one of a wireless LAN 331 and a short-distance communication unit 332. For example, the communication unit 330 may include one of the wireless LAN 331 and the short-distance communication unit 332 or may include both the wireless LAN 331 and the short-distance communication unit 332.

The wireless LAN 331 may be connected to an AP, according to control by the control unit 310, by using wireless communication in a place where the AP is installed. The wireless LAN 331 supports a wireless LAN standard (IEEE802.11x) of the IEEE. The short-distance communication unit 332 may wirelessly connect, according to control by the control unit 310, the electronic apparatus 100 and the external apparatus 200 by using short-distance communication without the AP.

The short-distance communication unit 332 may include Bluetooth and other short-distance communication (e.g., NFC, BLE, or the like).

The communication unit 330 may receive, according to control by the control unit 310, environment information or status information from the external apparatus 200. The communication unit 330 may receive, from the electronic apparatus 100, a request to transmit the environment information or the status information, according to control of the control unit 310. The communication unit 330 may transmit, according to control by the control unit 310, the environment information or the status information to the electronic apparatus 100.

The server 300 may include a speaker (not shown) that outputs audio.

The storage unit 375 may store various data and a control program so as to drive and control the server 300, according to control of the control unit 310. The storage unit 375 may store a signal or data that is input or output, which corresponds to operations of the communication unit 330, the power supply 380, and the display unit 390.

The storage unit 375 may store information about an external apparatus status corresponding to the external apparatus 200 and information about an electronic apparatus status corresponding to the electronic apparatus 100. The storage unit 375 may store external apparatus status information received from the external apparatus 200, and electronic apparatus status information received from the electronic apparatus 100. The storage unit 375 may store a control packet that corresponds to execution of a group action capable of changing a status of the external apparatus 200.

The storage unit 375 may store management software (not shown) that manages the electronic apparatus 100, the external apparatus 200, and status information of each of the electronic apparatus 100 and the external apparatus 200. The storage unit 375 may store changed status information of the external apparatus 200 which is received in correspondence to a control packet transmitted to the external apparatus 200.

The storage unit 375 may include a non-volatile memory, a volatile memory, a HDD, or a SSD.

The power supply 380 may supply, according to control by the control unit 310, an input power from an external power source to the internal elements 330-380 of the server 300.

The display unit 390 may display, according to control by the control unit 310, an image or a text corresponding to information (e.g., environment information, status information, a control command, etc.) received from the electronic apparatus 100 or the external apparatus 200. For example, the display unit 390 may include an LCD, an OLED, a plasma display panel (PDP), or a vacuum fluorescent display (VFD). It will be obvious to one of ordinary skill in the art that video information and/or text information may vary according to the display techniques.

It will be obvious to one of ordinary skill in the art that at least one of the elements (e.g., elements 330-380) of the server 300 shown in FIGS. 1 and 2C may be removed or at least one element may be added, according to performance of the server 300.

Figure 3:
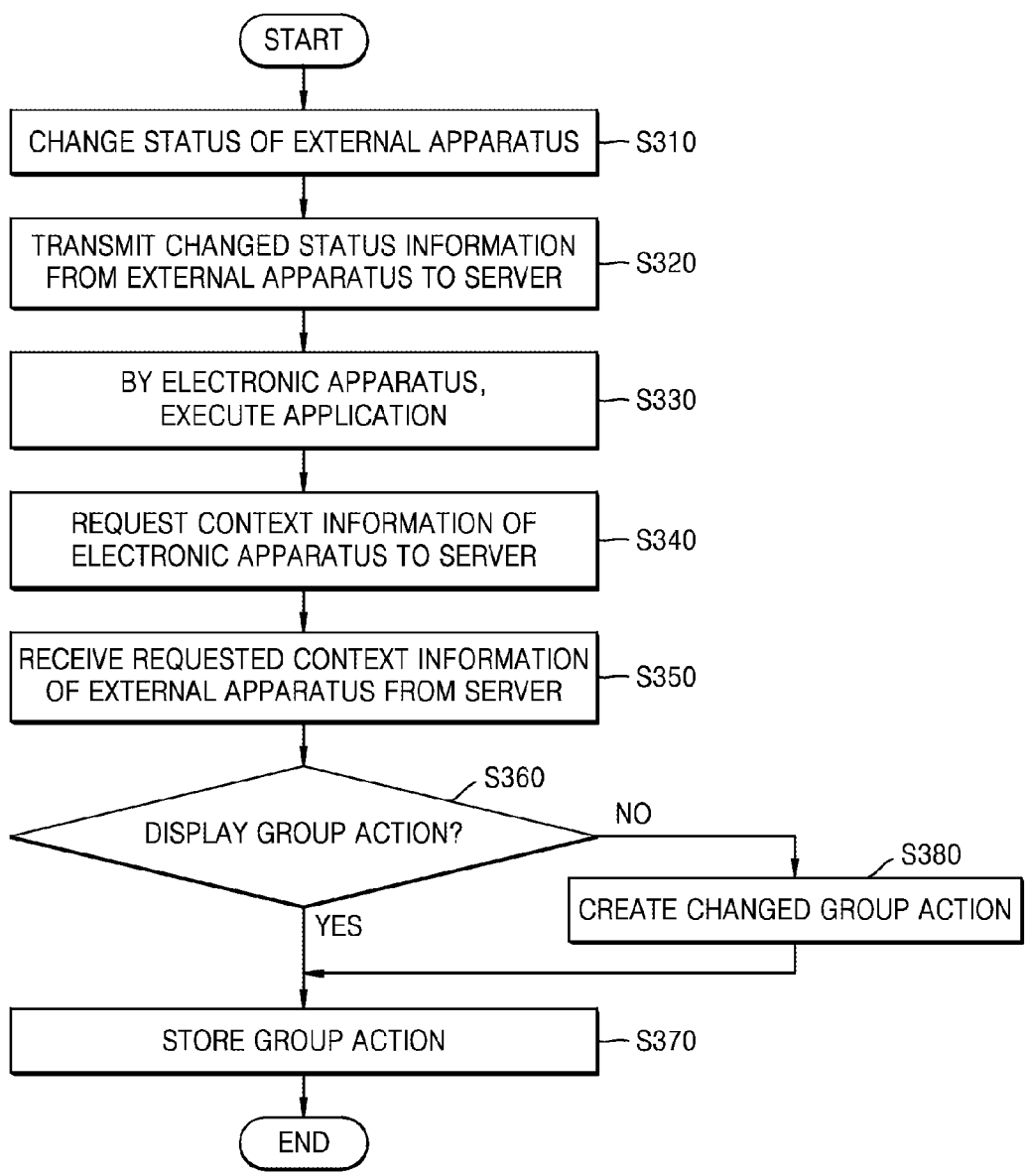
FIG. 3 is a flowchart of a method of controlling a group action among an electronic apparatus, an external apparatus, and a server according to an embodiment of the present disclosure.

FIG. 3 is a flowchart of a method of controlling a group action among an electronic apparatus, an external apparatus, and a server according to an embodiment of the present disclosure.

FIGS. 6A to 6F illustrate example screens of an electronic apparatus according to various embodiments of the present disclosure.

Referring to FIG. 3, in operation S310, a status of the external apparatus 200 is changed.

Referring to FIG. 6A, various examples of the external apparatus 200 which are connectable to the server 300 may be arranged around a user. For example, the external apparatus 200 may include a display apparatus 201, a robotic vacuum cleaner 202, a washing machine 203, an air conditioner 204, a lamp 205, or an automatic door lock 206 that are arranged in a house of the user. It will be obvious to one of ordinary skill in the art that the external apparatus 200 is not limited to the various examples and may further include various other external apparatuses capable of transmitting, by using a communication unit, status information at a transmission time or changed status information.

In the present embodiment, the control unit 210 of the external apparatus 200 may mean a control unit of each of the apparatuses 201, 202, 203, 204, 205, and 206.

In the present embodiment, a status of the external apparatus 200 may mean a context of the external apparatus 200. Status information corresponding to the status of the external apparatus 200 may mean context information of the external apparatus 200. A status change of the external apparatus 200 may mean a change in the context information of the external apparatus 200.

The context information of the external apparatus 200 may include items such as an external apparatus ID, an external apparatus name, operation information (e.g., a busy status, a standby operation, a power on or off status, a data transfer operation, etc.) of the external apparatus 200, space information (e.g., a location, a movement direction, a movement speed, etc.) of the external apparatus 200, environment information (e.g., a temperature, a humidity, illuminance, noise, etc.) around the external apparatus 200, available resource information (e.g., a battery residual capacity, display resolution, a processor clock speed, a memory resource, etc.) about the external apparatus 200, history information (e.g., an operation time, a standby time, etc.) corresponding to an operation of the external apparatus 200, error information (e.g., an error part, an error occurrence time, after service (A/S) treatment, an A/S date, etc.) about the external apparatus 200, or the like.

Context information of the electronic apparatus 100 may include items such as an electronic apparatus ID, an electronic apparatus name, operation information (e.g., a busy status, a standby operation, a power on or off status, a data transfer operation, etc.) of the electronic apparatus 100, space information (e.g., a location, a movement direction, a movement speed, etc.) of the electronic apparatus 100, environment information (e.g., a temperature, a humidity, illuminance, noise, etc.) around the electronic apparatus 100, available resource information (e.g., a battery residual capacity, display resolution, a processor clock speed, a memory resource, etc.) about the electronic apparatus 100, history information (e.g., an operation time, a standby time, etc.) corresponding to an operation of the electronic apparatus 100, error information (e.g., a defective part, an error occurrence time, A/S treatment, an A/S date, etc.) about the electronic apparatus 100, or the like. Also, the context information of the electronic apparatus 100 may include user information (e.g., a user ID, a password, a user name, biological information (e.g., a fingerprint, an iris, pulse, blood pressure, a body temperature, etc.) about a user who carries the electronic apparatus 100.

A status of the external apparatus 200 positioned at a periphery (e.g., a living room, a kitchen, a room, an office, etc.) of the user may be changed according to user input. The status and the status change of the external apparatus 200 may be detected by the sensor unit 270 of the external apparatus 200 or by a sensor (not shown) that detects operation of a mechanical or electrical switch.

According to a preset condition (e.g., a sunset, a rain, etc.), the status of the external apparatus 200 positioned at the periphery may be automatically changed. The external apparatus 200 may change the status of the external apparatus 200 in correspondence to detection with respect to a status change (e.g., "go out", etc.) of the user or a status change of the electronic apparatus 100.

The user may manually change the status of the external apparatus 200 around the user in correspondence to a status change (e.g., "go out" by the user, sleep of the user, etc.) of the user. The status change manually performed by the user may include a case in which the user directly changes the status of the external apparatus 200 (e.g., by pressing a power button of the external apparatus 200) or a case in which the user changes the status of the external apparatus 200 by using an application of the electronic apparatus 100.

Before the user leaves a house, the user may manually change the status of the external apparatus 200 by turning off power of the display apparatus 201, by starting cleaning by the robotic vacuum cleaner 202, by starting washing by the washing machine 203, by turning off a power of the air conditioner 204, by turning off power of the lamp 205, or by changing the automatic door lock 206 to a lock status. Also, before the user leaves the house, the user may change the statuses of the apparatuses 201, 202, 203, 204, 205, and 206 to one of various combinations that are familiar with the user. The various combinations may include a status change order of the apparatuses 201, 202, 203, 204, 205, and 206 or the number of the apparatuses 201, 202, 203, 204, 205, and 206 whose statuses are changed (e.g., a status change of one external apparatus, a status change of two external apparatuses, a status change of three external apparatuses, a status change of four external apparatuses, a status change of five external apparatuses, or a status change of all external apparatuses).

If the user leaves the house, a spatial status (e.g., location information) in the status information of the electronic apparatus 100 may be changed. If the user moves from a living room to a bed room, location information (e.g., a spatial status) in the status information of the electronic apparatus 100 may be changed.

The control unit of each of the apparatuses 201, 202, 203, 204, 205, and 206 may store changed status information of each of the apparatuses 201, 202, 203, 204, 205, and 206 in a storage unit. Examples of status information stored in some storage units are described below. Table 1 below shows an example of status information stored in a storage unit of the display apparatus 201.

TABLE 1

| Name of apparatus | Status | Change time |
|---|---|---|
| Television | Off | 09:05 |
| Television | On | 06:01 |
| Television | Off | 00:38 |

Table 2 below shows an example of status information stored in a storage unit of the lamp 205.

TABLE 2

| Name of apparatus | Status | Change time |
|---|---|---|
| Lighter | Off | 09:06 |
| Lighter | On | 06:00 |
| Lighter | Off | 00:39 |

Here, the stored status information may include a plurality of items indicating an external apparatus ID, an external apparatus name, and a status change time, but it will be obvious to one of ordinary skill in the art that the stored status information may further include items indicating various types of information.

Storage units of other external apparatuses may store status information as shown in Table 1 or Table 2.

The electronic apparatus 100 may request (e.g., by an input of the user) the server 300 to start monitoring a status of the external apparatus 200 by using an application 610 (refer to FIG. 6C). The control unit 310 of the server 300 may start monitoring the status of the external apparatus 200, in response to "monitoring start". The control unit 310 of the server 300 may notify the external apparatus 200 about the "monitoring start". When a status change occurs in the external apparatus 200, the control unit 210 of the external apparatus 200 may transmit, to the server 300, external apparatus context information corresponding to the status change of the external apparatus 200.

The electronic apparatus 100 may request (e.g., by an input of the user) the server 300 to end monitoring of the status of the external apparatus 200 by using the application 610 (refer to FIG. 6C).

Referring to FIG. 3, in operation S320, changed status information is transmitted from the external apparatus 200 to the server 300.

Referring to FIG. 6A, the control unit 210 of the external apparatus 200 may transmit, to the server 300, status information corresponding to a changed status. The control unit 210 of the external apparatus 200 may transmit the changed status information to the server 300. Status information corresponding to a status of the external apparatus 200 may mean context information of the external apparatus 200. The changed status information may be status information including changed items from among the items included in the status information or may be status information including the changed items and some items from among unchanged items. The control unit 210 of the external apparatus 200 may transmit the changed status information to the server 300 by using server information stored in the storage unit 275. The stored server information may include a server ID, a server name, or server connection information (e.g., service set ID (SSID), an Internet protocol (IP) address, a media access control address (MAC address), a channel number, a security key, etc.).

The control unit 210 of the external apparatus 200 may periodically (e.g., every 5,000 ms—changeable) transmit, to the server 300, at least one of status information at transmission time, status information at a response time with respect to an external request, and status information that is transmitted in correspondence to occurrence of a status change, by using the communication unit 230.

The control unit 210 of the external apparatus 200 may store the changed status information in the storage unit 275. The control unit 210 of the external apparatus 200 may store, in the storage unit 275, transmission status information corresponding to the transmitted status information. The stored transmission status information may include a transmission ID for history management, an external apparatus name, a transmission start time, a transmission end time, an ID of a receiving apparatus, a MAC address of the receiving apparatus, the transmitted status information, or the like.

The control unit 210 of the external apparatus 200 may transmit the status information (or the context information) corresponding to the changed status to the server 300 and the electronic apparatus 100.

When a status of the electronic apparatus 100 is changed, the control unit 110 of the electronic apparatus 100 may transmit status information (or context information) corresponding to the changed status of the electronic apparatus 100 to the server 300. The control unit 110 of the electronic apparatus 100 may store changed status information in the storage unit 175. The changed status information of the electronic apparatus 100, which is stored in the storage unit 175, may include a change ID for history management, a status change time, a location before a change, a location after the change, or the like.

The control unit 310 of the server 300 may store, in the storage unit 375, the status information received from the external apparatus 200 or the status information received from the electronic apparatus 100.

Table 3 below shows an example of status information that is received from each of the apparatuses 201, 202, 203, 204, 205, and 206 and is stored in the storage unit 375 of the server 300.

TABLE 3

| Name of external apparatus | Status | Change time |
|---|---|---|
| Auto door lock | Off | 09:05 |
| Lighter | Off | 09:04 |
| Air conditioner | Off | 09:03 |
| Washing machine | On | 09:03 |
| Robotic vacuum cleaner | On | 09:01 |
| Television | Off | 09:01 |
| * | * | * |
| * | * | * |
| * | * | * |
| Television | On | 06:01 |
| Lighter | On | 06:00 |

Here, the stored status information may include a plurality of items indicating an external apparatus ID, an external apparatus name, and a status change time, but it will be obvious to one of ordinary skill in the art that the stored status information may further include items indicating various types of information.

The status information stored in the storage unit 375 of the server 300 may be collectively stored as shown in Table 3 or may be stored according to each of the apparatuses 201, 202, 203, 204, 205, and 206 as shown in Table 1.

Referring to FIG. 3, in operation S330, an application is executed in the electronic apparatus 100.

Referring to FIG. 6B, a user performs a first touch 301 on a shortcut icon 193g corresponding to a selection-target application from among shortcut icons 193a-193i displayed on a screen of the electronic apparatus 100. The control unit 110 may detect the first touch 301 by using the touchscreen 190 and the touchscreen controller 195. The control unit 110 may calculate a first touch location 301a (e.g., X1 and Y1 coordinates) corresponding to the first touch 301, by using an electric signal received from the touchscreen controller 195.

The control unit 110 may store first touch location information corresponding to the first touch location 301a in the storage unit 175. The stored first touch location information may include a touch ID for history management, a touch location, a touch detection time, touch information (e.g., a touch pressure, a touch direction, a touch duration time, etc.), or the like.

Referring to FIG. 6C, the control unit 110 of the electronic apparatus 100 may display, on the screen, the application 600 corresponding to the first touch 301.

Figure 6D:
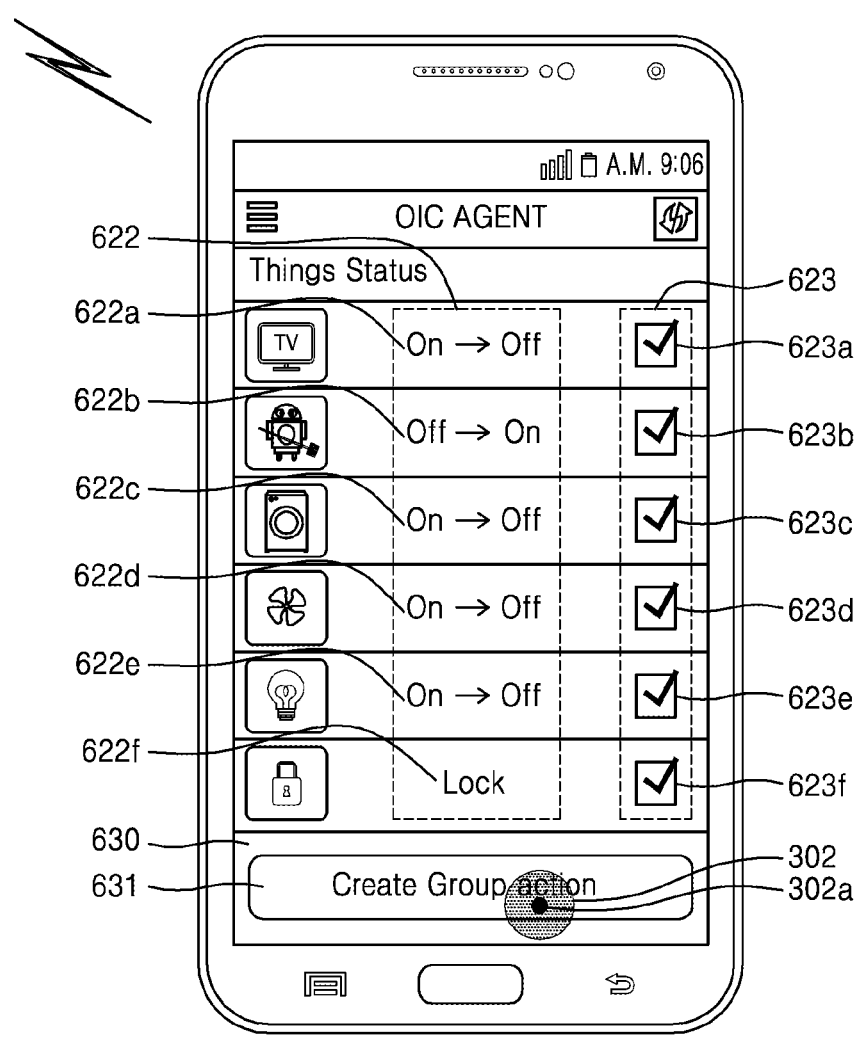

The application 600 may include an application name area 610 including an application name 611, an ID (e.g., icons 621a-621f) corresponding to the external apparatus 200, and a display area 620 displaying changed statuses 622 (refer to FIG. 6D). The application 600 may include an interaction area 630 displaying an interaction between the application 600 and the user.

The application name area 610 may include a menu 612 and an icon 613 corresponding to a refresh. The display area 620 of the application 600 may include at least one or both of a sub-title 620a and a selection box 623 (refer to FIG. 6D) that receives user's selection.

When a checkmark is included in the selection box 623, this may mean that the status of the external apparatus 200 is already changed or is going to be changed. In a case where external apparatus status information, which is received from the server 300, includes a selection box including a checkmark, a status of the external apparatus 200 related to the external apparatus status information may have been already changed. When external apparatus status information, which is transmitted from the electronic apparatus 100 to the server 300, includes a selection box including a checkmark, a status of the external apparatus 200 related to the external apparatus status information may be changed.

When the number of icons corresponding to the external apparatus 200 displayed on the display area 620 is greater than the number of icons displayable on the screen, the control unit 110 may display a scroll bar (not shown) to be scrolled by the user, and one or more icons (not shown) that correspond to scrollable directions.

In the electronic apparatus 100, an application may be executed without the first touch 301 by the user. For example, when changed status information is received from the external apparatus 200, the control unit 310 of the server 300 may request the electronic apparatus 100 to execute the application 600 corresponding to a state change of the external apparatus 200.

When changed status information is received from the electronic apparatus 100, the control unit 310 of the server 300 may request the electronic apparatus 100 to execute the application 600 corresponding to a state change of the external apparatus 200. When changed status information is received from each of the external apparatus 200 and the electronic apparatus 100, the control unit 310 of the server 300 may request the electronic apparatus 100 to execute the application 600 corresponding to a state change of the external apparatus 200. The control unit 310 of the server 300 may transmit, to the electronic apparatus 100, a control command (e.g., a control packet) corresponding to execution of the application 600 by using the communication unit 330.

Referring to FIG. 3, in operation S340, context information of the electronic apparatus 100 is requested to the server 300.

Referring to FIGS. 6C and 6D, the control unit 110 of the electronic apparatus 100 may request, in response to the first touch 301, the server 300 for status information of the external apparatus 200 that is most recently changed. For example, the term "most recently" may correspond to a time 30 minutes (changeable) prior to when the status request is made. The control unit 110 of the electronic apparatus 100 may request, via the application 600 executed in response to the first touch 301, the server 300 for the status information of the external apparatus 200 that is most recently changed.

The control unit 110 of the electronic apparatus 100 may request status information of an external apparatus (e.g., at least one of the apparatus 201, 202, 203, 204, 205, and 206) that corresponds to a status change (e.g., a location change from a location in a house to a location outside the house) of the electronic apparatus 100. The external apparatus that corresponds to the status change of the electronic apparatus 100 may indicate an external apparatus at a location (e.g., in the house) at a time 30 minutes (changeable) prior to the status change of the electronic apparatus 100 occurring, wherein the location indicates a location of the electronic apparatus 100 before the location change occurs.

In correspondence to the status change (e.g., the location change from the location in the house to the location outside the house) of the electronic apparatus 100, the control unit 110 of the electronic apparatus 100 may request, via the application 600, a plurality of pieces of status information about external apparatuses (e.g., one or more of the apparatuses 201, 202, 203, 204, 205, and 206) at the location (e.g., in the house) before the most recent location change occurs.

When the electronic apparatus 100 and the server 300 are disconnected (e.g., due to a change in an address of the server 300, etc.), the control unit 110 of the electronic apparatus 100 may request each of the apparatuses 201, 202, 203, 204, 205, and 206 for status information by using stored external apparatus information.

Referring to FIG. 3, in operation S350, the requested context information of the external apparatus 200 is received from the server 300.

The control unit 110 of the electronic apparatus 100 may receive the context information from the server 300 by using the mobile communication unit 120, in response to a context information request. The received context information may include the status information of the external apparatus 200 that is most recently changed, the status change (e.g., the change in the location in the house to the location outside the house) of the electronic apparatus 100, or the status information of the external apparatus (e.g., at least one of the apparatuses 201, 202, 203, 204, 205, and 206) that corresponds to the status change of the electronic apparatus 100. Location change information of the electronic apparatus 100 may be used as location information for creating a group action.

The received context information may include one or more pieces of status information of the external apparatus 200 which correspond to a change order with respect to the status information request from the electronic apparatus 100.

When the electronic apparatus 100 and the server 300 are not connected (e.g., the change in the address of the server 300, etc.), the control unit 110 of the electronic apparatus 100 may receive, by using the communication unit 130, the context information that is received from the external apparatus 200 in response to a context information request.

The control unit 110 of the electronic apparatus 100 may store, in the storage unit 175, the context information received by using the communication unit 130.

Referring to FIG. 3, in operation S360, a group action is displayed.

Referring to FIG. 6D, the control unit 110 of the electronic apparatus 100 may display the context information that is received from the server 300 (or is stored in the electronic apparatus 100). The control unit 110 of the electronic apparatus 100 may display, via the application 600, the context information that is received from the server 300 (or is stored in the electronic apparatus 100). Alternatively, the control unit 110 of the electronic apparatus 100 may process the context information that is received from the server 300 (or is stored in the electronic apparatus 100), and may display processed context information on the application 600. For example, the processing may include displaying the external apparatus 200 as an icon, displaying the changed status in an intuitive manner (by distinguishing between an unchanged status and the changed status of the external apparatus 200), or the like. The control unit 110 may display the context information received from the server 300, in correspondence to a change time of the external apparatus 200. Alternatively, the control unit 110 may display a plurality of pieces of the context information received from the server 300, in an order according to power consumption (e.g., in a descending order of power consumption) or according to a user's preference.

Comparing to the screen of FIG. 6C, the control unit 110 of the electronic apparatus 100 may display, on the display area 620 of the application 600, the icons 621a-621f corresponding to the external apparatus 200, changed statuses 622a-622f, and selection boxes 623a-623f.

When the number of icons displayed on the display area 620 is greater than the number (e.g., 6) of icons displayable on the display area 620, the control unit 110 may display a scroll bar (not shown) to be scrolled by a touch (or hovering), and symbols (e.g., ↑, ↓ or Δ, ∇ (not shown)) corresponding to scrollable directions.

The control unit 110 of the electronic apparatus 100 may display a button 631 that is selectable in correspondence to "create a group action" in the interaction area 630 of the application 600.

When the user performs a second touch 302 on the button 631 in the interaction area 630, the control unit 110 may create a new group action. The control unit 110 may detect the second touch 302 by using the touchscreen 190 and the touchscreen controller 195. The control unit 110 may calculate a second touch location 302a (e.g., X2 and Y2 coordinates) corresponding to the second touch 302, by using an electric signal received from the touchscreen controller 195.

The control unit 110 may store, in the storage unit 175, second touch location information that corresponds to the second touch location 302a. The stored second touch location information may include a touch ID for history management, a touch location, a touch detection time, touch information (e.g., a touch pressure, a touch direction, a touch duration time, etc.), or the like.

The group action may mean a set of actions of one or more external apparatuses 200, and at least one action included in the group action may include a control command for changing a status of the external apparatus 200 related to the at least one action. When the group action is created, group action information corresponding to the group action may be created and may be stored. The group action information may include information about whether or not to perform a set operation (e.g., a status change) of the external apparatuses 200 which corresponds to a set context.

For example, the group action information may include, but is not limited to, a group action title, an external apparatus ID, an external apparatus name, status change information (e.g., On↔OFF, etc.) with respect to the external apparatus, status change condition information (e.g., 5 minutes of a limited period) with respect to the external apparatus, or the like.

The control unit 110 of the electronic apparatus 100 may collectively change statuses of the external apparatuses 200 corresponding to the group action by executing the created group action. Alternatively, the control unit 110 of the electronic apparatus 100 may automatically change the statuses of the external apparatuses 200 corresponding to the group action by executing the created group action.

Referring to FIG. 3, in operation S360, if the displayed group action is stored, the method proceeds to operation S370.

In operation S370, the group action is stored.

The control unit 110 of the electronic apparatus 100 may display the keypad 166 and an input window for a new group action title (not shown) on the screen, in correspondence to the second touch 302. The user may input the new group action title by using the keypad 166. The input new group action title may be "go out". When a new group action is input, the user may select "OK" (not shown) displayed on the screen. A creation location of a group action having "go out" as its group action title may be a front door. When the electronic apparatus 100 arrives at the front door, the server 300 may recommend the group action having "go out" as its group action title to the electronic apparatus 100.

Figure 6E:
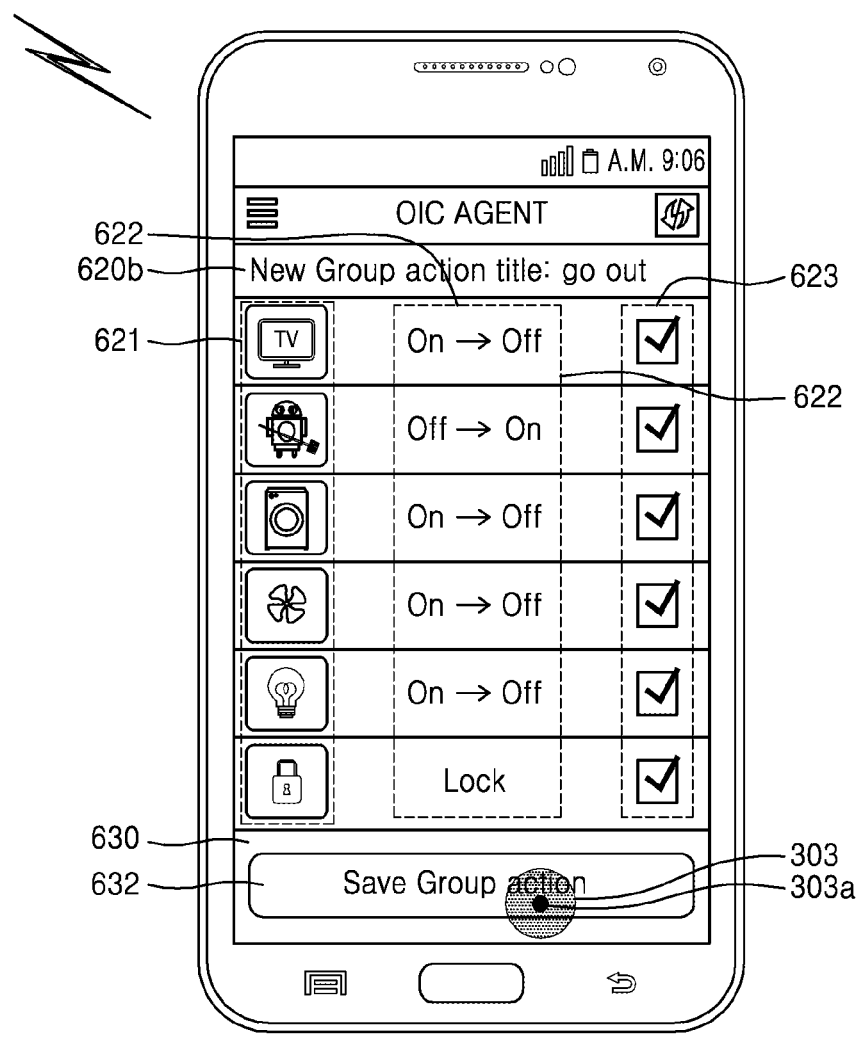

Referring to FIG. 6E, the control unit 110 of the electronic apparatus 100 may change the sub-title 620a to an input new group action title 620b. When the new group action title 620b is selected by the user, the new group action title 620b may be modified via the keypad 166.

The control unit 110 of the electronic apparatus 100 may display a button 632 that is selectable in correspondence to "save group action" in the interaction area 630 of the application 600.

When items 621-623 that are displayed on the display area 620 are not changed, the user performs a third touch 303 on the button 632 in the interaction area 630. The control unit 110 of the electronic apparatus 100 may detect the third touch 303 by using the touchscreen 190 and the touchscreen controller 195. The control unit 110 of the electronic apparatus 100 may calculate a third touch location 303a (e.g., X3 and Y3 coordinates) corresponding to the third touch 303, by using an electric signal received from the touchscreen controller 195.

The control unit 110 of the electronic apparatus 100 may store, in the storage unit 175, third touch location information that corresponds to the third touch location 303a. The stored third touch location information may include a touch ID for history management, a touch location, a touch detection time, touch information (e.g., a touch pressure, a touch direction, a touch duration time, etc.), or the like.

The control unit 110 of the electronic apparatus 100 may provide the user with feedback corresponding to storage of the group action. The feedback provided by the electronic apparatus 100 may be provided as one of visual feedback, acoustic feedback, and tactile feedback to the user. The control unit 110 may provide the user with one of the visual feedback, the acoustic feedback, and the tactile feedback or a combination of the visual feedback, the acoustic feedback, and the tactile feedback via the electronic apparatus 100.

The visual feedback may be displayed differently from an object displayed in the application 600, wherein the visual feedback has a visual effect (e.g., a separate image or an animation effect such as a fade-in or fade-out effect applied to the separate image) that corresponds to storage of the group action. The acoustic feedback may be output from the speaker 163, as sound that corresponds to storage of the group action. The tactile feedback may be output from the vibration motor 164, in correspondence to storage of the group action.

Feedback (e.g., at least one of the visual feedback, the acoustic feedback, and the tactile feedback) that corresponds to storage of the group action may be selected and/or changed in a configuration setting (not shown) of the electronic apparatus 100.

The user may input and/or may change a feedback provision time (e.g., 300 ms, changeable) during which at least one feedback is provided to the user.

In correspondence to the third touch 303, the control unit 110 of the electronic apparatus 100 may store, in the storage unit 175, group action information including a group action title (e.g., GO OUT) that corresponds to the group action. The group action information may include the group action title, an external apparatus ID, an external apparatus name, status change information (e.g., On↔Off, Unlock↔Lock, etc.) of an external apparatus, or a status-change limitation period (e.g., 5 min) with respect to the external apparatus. Alternatively, the group action information may not include the group action title (e.g., GO OUT).

Referring to FIG. 3, in operation S370, when the group action is stored, the method of controlling a group action, the method being performed by the electronic apparatus 100, is ended.

Referring back to operation S360, if another group action is created by changing the context information, the method proceeds to operation S380.

In operation S380, a changed group action is stored.

Figure 6F:
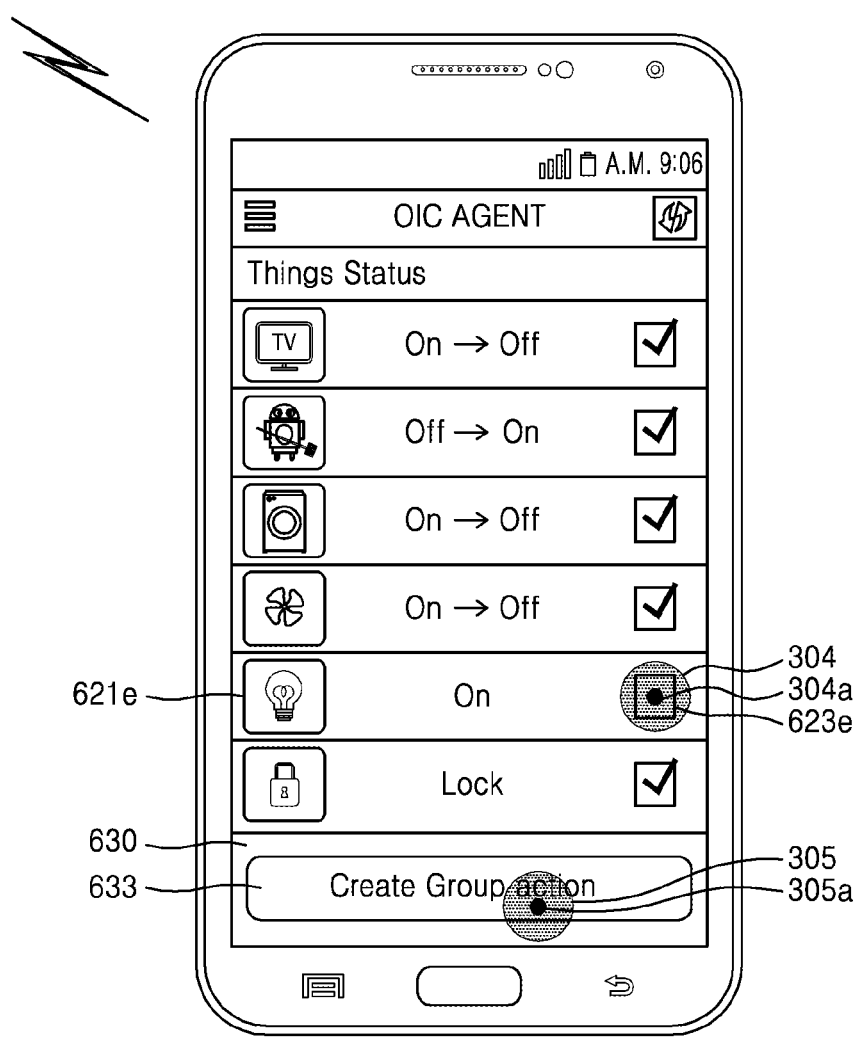

Referring to FIG. 6F, the user performs a fourth touch 304 on the selection box 623e. The control unit 110 of the electronic apparatus 100 may display the selection box 623e as an empty box, in correspondence to the fourth touch 304. The control unit 110 of the electronic apparatus 100 may detect the fourth touch 304 by using the touchscreen 190 and the touchscreen controller 195. The control unit 110 may calculate a fourth touch location 304a (e.g., X4 and Y4 coordinates) corresponding to the fourth touch 304, by using an electric signal received from the touchscreen controller 195. The detection of the fourth touch 304, by the control unit 110, is substantially similar (e.g., different touch names) to the first touch 301, the second touch 302, and the third touch 303, and thus, overlapping descriptions thereof are omitted here.

When the user re-selects the selection box 623e in a blank state, the control unit 110 of the electronic apparatus 100 may display a checkmark in the re-selected selection box 623e. When the user selects a plurality of selection boxes (e.g., the selection boxes 623c and 623d), the control unit 110 of the electronic apparatus 100 may display the selection boxes 623c and 623d as empty boxes, in correspondence to the selection.

When the user selects the selection box 623e that corresponds to change-target context information, the control unit 110 of the electronic apparatus 100 may display a button 633 corresponding to "create a changed group action" in the interaction area 630. Alternatively, after the button 633 is displayed, the user may select a selection box.

When the changed group action is generated, the user performs a fifth touch 305 on the button 633 in the interaction area 630. The control unit 110 may detect the fifth touch 305 by using the touchscreen 190 and the touchscreen controller 195. The detection of the fifth touch 305, by the control unit 110, is substantially similar (e.g., different touch names) to the first touch 301, the second touch, 302, the third touch 303, and the fourth touch 304, and thus, overlapping descriptions thereof are omitted here.

In operation S380, when the changed group action is stored, the method proceeds to operation S370.

In operation S370, when the changed group action is stored, the method of controlling a group action, the method being performed by the electronic apparatus 100, is ended.

Figure 4:
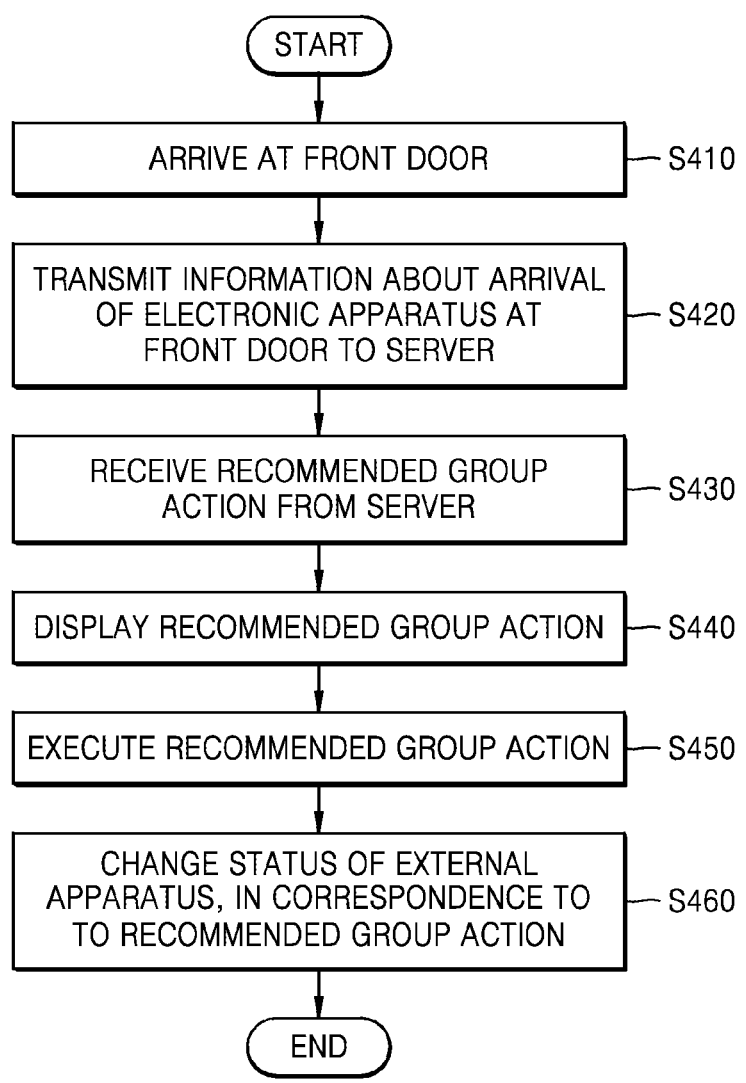
FIG. 4 is a flowchart of a method of controlling a group action among an electronic apparatus, an external apparatus, and a server according to an embodiment of the present disclosure.

FIG. 4 is a flowchart of a method of controlling a group action among an electronic apparatus 100, an external apparatus 200, and a server according to an embodiment of the present disclosure.

FIGS. 7A to 7E illustrate example screens of an electronic apparatus according to various embodiments of the present disclosure.

Referring to FIG. 4, in operation S410, a user arrives at a front door.

Figure 7A:
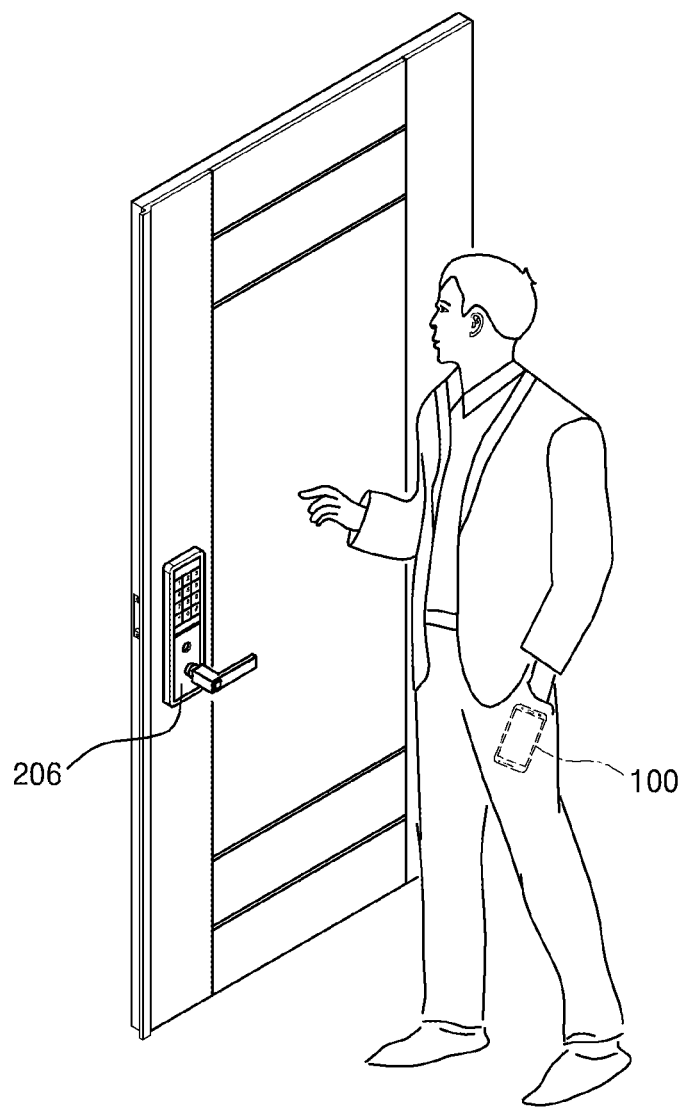

Referring to FIG. 7A, the electronic apparatus 100 that is carried by the user arrives at the front door. The application 600 of the electronic apparatus 100 may have been being executed before the user arrives at the front door.

The control unit 110 of the electronic apparatus 100 may determine the arrival at the front door, by receiving location information via the GPS 155 or by connecting the electronic apparatus 100 to the server 300 via the communication unit 130. The control unit 110 may be connected to the server 300 by using the communication unit 130 and server information stored in the storage unit 175.

The control unit 110 of the electronic apparatus 100 may determine the arrival at the front door, by being connected to the automatic door lock 206 that is one of the external apparatuses 200, wherein the connection is made via the communication unit 130. When the electronic apparatus 100 (in which the application 600 is not executed) that is carried by the user arrives at the front door, the control unit 110 of the electronic apparatus 100 may execute the application 600.

When the electronic apparatus 100 approaches or contacts the automatic door lock 206, the electronic apparatus 100 and the automatic door lock 206 may be wirelessly connected to each other. The automatic door lock 206 may receive an ID of the electronic apparatus 100 from the electronic apparatus 100. When the automatic door lock 206 receives the ID of the electronic apparatus 100, a status of the automatic door lock 206 may be changed (e.g., from a lock status to an unlock status). Changed status information of the automatic door lock 206 may be transmitted to the server 300. The changed status information of the automatic door lock 206 may include the ID of the electronic apparatus 100 and may be transmitted to the server 300.

The server 300 may receive the changed status information of the automatic door lock 206. The control unit 310 of the server 300 may determine whether the electronic apparatus 100 has arrived at the front door, by using the changed status information of the automatic door lock 206.

The control unit 110 of the electronic apparatus 100 may receive an ID of the automatic door lock 206 from the automatic door lock 206. The control unit 110 of the electronic apparatus 100 may also receive a location (e.g., spatial information of the automatic door lock 206 from the automatic door lock 206. The control unit 110 of the electronic apparatus 100 may determine a status change (e.g., arrival at the front door) of the electronic apparatus 100 by using the ID of the automatic door lock 206 and the spatial information of the automatic door lock 206.

The arrival of the electronic apparatus 100 at the front door may mean that spatial information among status information of the electronic apparatus 100 is changed. When the electronic apparatus 100 in which the application 600 is being executed arrives at the front door, the application 600 of the electronic apparatus 100 may detect a change in the status information of the electronic apparatus 100, in correspondence to connection with the automatic door lock 206. In correspondence to the arrival of the electronic apparatus 100 at the front door, the application 600 of the electronic apparatus 100 may automatically detect the status information of the electronic apparatus 100.

The control unit 110 of the electronic apparatus 100 may store the changed status information in the storage unit 175, in correspondence to the arrival at the front door. The stored changed status information of the electronic apparatus 100 may include a change ID for history management, a status change time, a location before the change, a location after the change, or the like.

Referring to FIG. 4, in operation S420, information about the arrival of the electronic apparatus 100 at the front door is transmitted to the server 300.

At the front door, if the electronic apparatus 100 and the server 300 are connected, the control unit 110 of the electronic apparatus 100 may transmit, to the server 300, status information corresponding to the arrival of the electronic apparatus 100 at the front door. The control unit 110 of the electronic apparatus 100 may transmit the changed status information to the server 300 by using the communication unit 130. The changed status information may be status information including changed items from among the items included in the status information or may be status information including the changed items and some items from among unchanged items. The control unit 110 may transmit the changed status information to the server 300 by using server information stored in the storage unit 175.

The control unit 110 of the electronic apparatus 100 may store, in the storage unit 175, transmission status information corresponding to the status information transmitted to the server 300. The stored transmission status information may include a transmission ID for history management, an electronic apparatus name, a transmission start time, a transmission end time, an ID of a receiving apparatus, a MAC address of the receiving apparatus, the transmitted status information, or the like.

Referring to FIG. 4, in operation S430, a recommended group action is received from the server 300.

The recommended group action (or a recommended group action list) that corresponds to the arrival of the electronic apparatus 100 at the front door is received from the server 300 via the communication unit 130. When the electronic apparatus 100 arrives at the front door, the control unit 310 of the server 300 may transmit, to the electronic apparatus 100, the recommended group action in which a creation location (e.g., the front door or around the front door) of a group action has been considered. In a case where a plurality of recommended group actions correspond to the arrival of the electronic apparatus 100 at the front door, the recommended group action list may be received from the server 300 via the communication unit 130.

The control unit 110 of the electronic apparatus 100 may store the received recommended group action (or the received recommended group action list) in the storage unit 175.

Referring to FIG. 4, in operation S440, the recommended group action is displayed.

Figure 7B:
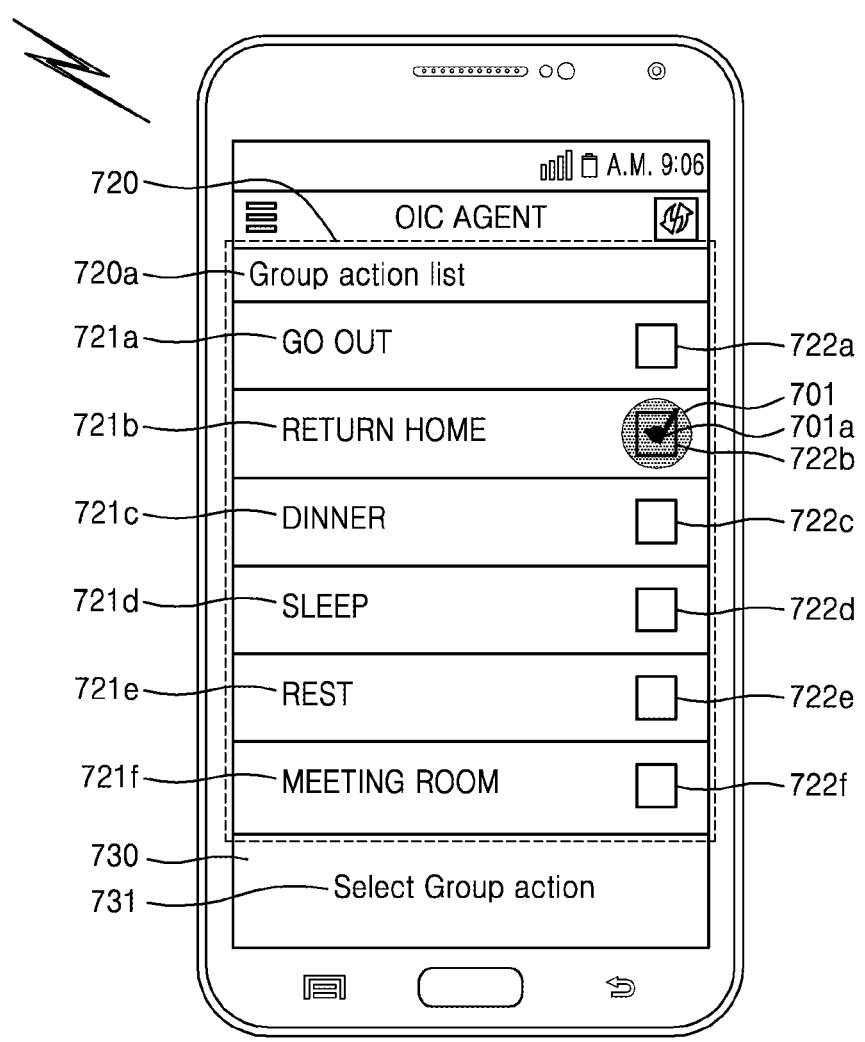
Figure 7C:
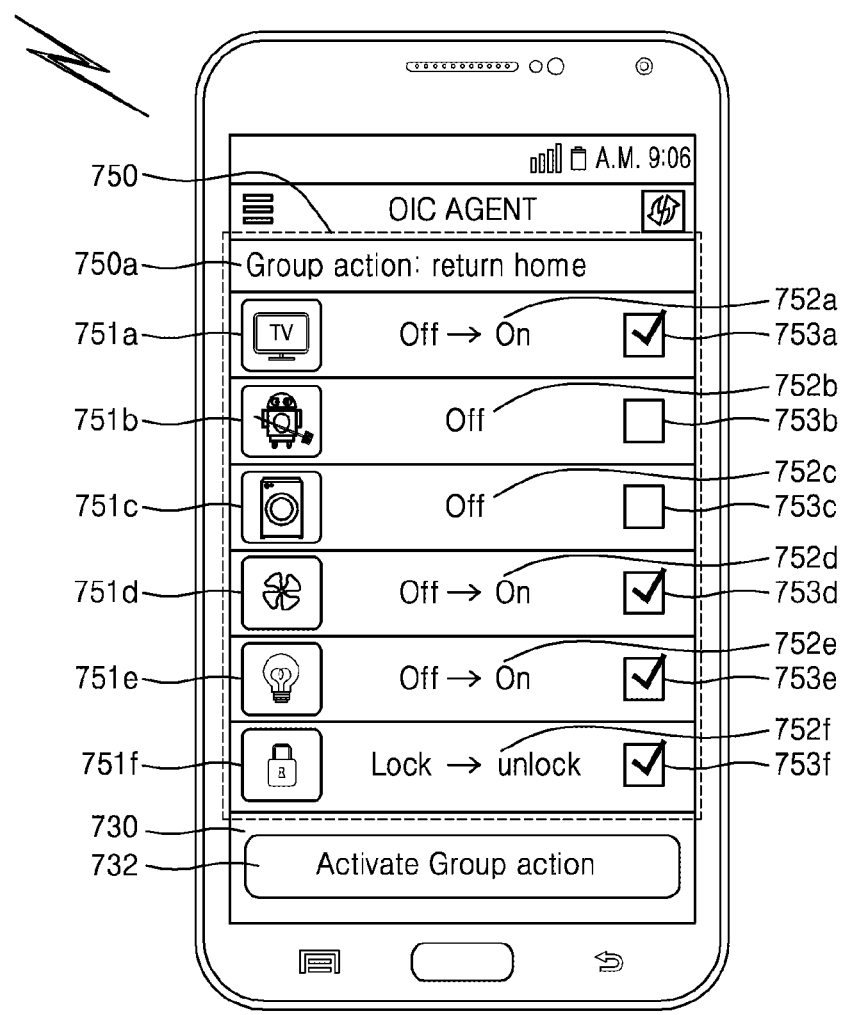

Referring to FIGS. 7B and 7C, the control unit 110 of the electronic apparatus 100 may display a received recommended group action (or a recommended group action list) on a screen of the electronic apparatus 100. The control unit 110 of the electronic apparatus 100 may display one of a received recommended group action list 720 and a recommended group action 750 (refer to FIG. 7C). The control unit 110 of the electronic apparatus 100 may process the received recommended group action 720 (or the recommended group action list 750) that is received from the server 300 (or is stored in the electronic apparatus 100), and may display processed recommended group action on the display area 620 of the application 600. For example, the processing may include displaying the external apparatus 200 as an icon, displaying the changed status in an intuitive manner (by distinguishing between an unchanged status and the changed status of the external apparatus 200), or the like.

The displayed recommended group action list 720 may include a sub-title 720a corresponding to the recommended group action list 720, and titles 721a-721f and selection boxes 722a-722f that correspond to a recommended group action.

When the number of titles displayed on the recommended group action list 720 is greater than the number of titles displayable on the display area 620, the control unit 110 may display a scroll bar (not shown) to be scrolled by the user, and one or more icons (not shown) that correspond to scrollable directions.

In order to select a title of a recommended group action, the user performs an eleventh touch 701 on the selection box 722b that corresponds to "Return home" that is the title 721b of the recommended group action. The control unit 110 may detect the eleventh touch 701 by using the touchscreen 190 and the touchscreen controller 195. The control unit 110 may calculate an eleventh touch location 701a (e.g., X11 and Y11 coordinates) corresponding to the eleventh touch 701, by using an electric signal received from the touchscreen controller 195.

The control unit 110 of the electronic apparatus 100 may store, in the storage unit 175, eleventh touch location information that corresponds to the eleventh touch location 701a. The stored eleventh touch location information may include a touch ID for history management, a touch location, a touch detection time, touch information (e.g., a touch pressure, a touch direction, a touch duration time, etc.), or the like.

The control unit 110 of the electronic apparatus 100 may mark selection on the selection box 722b corresponding to the "Return home" 721b, in correspondence to the eleventh touch 701.

The control unit 110 of the electronic apparatus 100 may display a text 731 corresponding to "Select a recommended group action title" on an interaction area 730 of the application 600. The control unit 110 may not display the text 731 that is displayed in correspondence to the eleventh touch 701.

According to the eleventh touch 701, the control unit 110 of the electronic apparatus 100 may display the recommended group action 750 corresponding to the "Return home" 721b that is the title of the recommended group action. The control unit 110 may display the recommended group action 750, in correspondence to the eleventh touch 701.

The displayed recommended group action 750 may include a title 750a corresponding to the recommended group action, external apparatus icons 751a-751f corresponding to the recommended group action, statuses to be changed 752a, and 752d-752f, and selection boxes 753a-753f.

When the number of icons corresponding to the external apparatuses 200 displayed on the recommended group action 750 is greater than the number of icons displayable on the display area 620, the control unit 110 may display a scroll bar (not shown) to be scrolled by the user, and one or more icons (not shown) that correspond to scrollable directions. It will be obvious to one of ordinary skill in the art that selection marked on the selection boxes 753a-753f may be changed by the user.

The control unit 110 of the electronic apparatus 100 may display a button 732 that is selectable in response to "Activate group action" on the interaction area 730 of the application 600.

In another embodiment, a recommended group action (or a recommended group action list) received by the electronic apparatus 100 may also be received (or may be shared) by an electronic apparatus (not shown) carried by a family member (e.g., mother, father, children, grandfather, grandmother, etc.). When each of electronic apparatuses (not shown) having a plurality of pieces of user information corresponding to family members are connected to the server 300, each of the electronic apparatuses having the plurality of pieces of user information corresponding to the family members may receive a recommended group action (or a recommended group action list) from the server 300. A procedure of receiving the recommended group action (or the recommended group action list), the procedure being performed in the electronic apparatuses carried by the family members, is substantially the same as a procedure of receiving the recommended group action (or the recommended group action list), the procedure being performed in the electronic apparatus 100 carried by the user, and thus, overlapping descriptions thereof are omitted here.

Referring to FIG. 7C, when one recommended group action is received, the control unit 110 of the electronic apparatus 100 may exclude the recommended group action list 720 and may directly display the recommended group action 750 on the display area 620 of the application 600.

A display of the recommended group action 750 is substantially similar (a display of a recommended group action list according to the number of recommended group actions) to a display of the recommended group action 750 selected from the recommended group action list 720, and thus, overlapping descriptions thereof are omitted here.

Referring to FIG. 4, in operation S450, the recommended group action is executed.

Figure 7D:
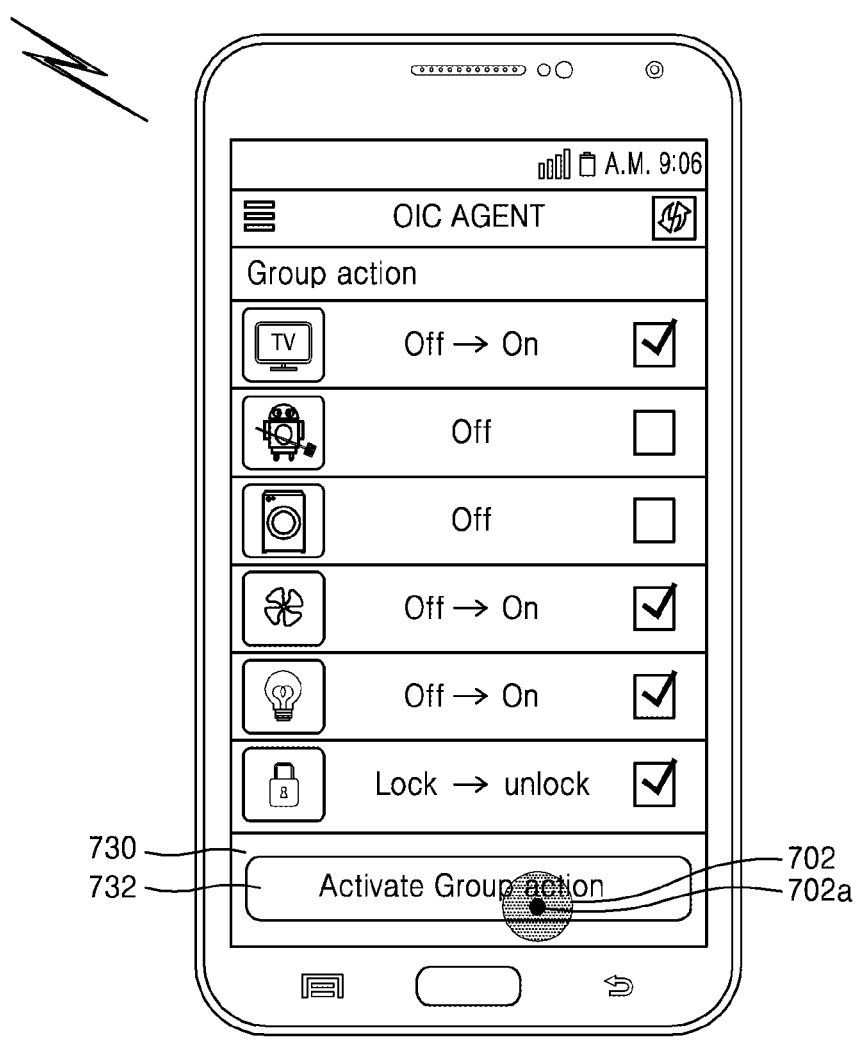

Referring to FIG. 7D, the user performs a twelfth touch 702 on a button 732 corresponding to execution of the recommended group action.

The control unit 110 of the electronic apparatus 100 may detect the twelfth touch 702 by using the touchscreen 190 and the touchscreen controller 195. The detection of the twelfth touch 702, by the control unit 110 of the electronic apparatus 100, is substantially similar (except for having different touch names) to the eleventh touch 701, and thus, overlapping descriptions thereof are omitted here. The control unit 110 of the electronic apparatus 100 may execute the displayed recommended group action 750, in correspondence to the twelfth touch 702.

The control unit 110 of the electronic apparatus 100 may generate a control command (e.g., a control packet) for changing statuses of the apparatuses 201, 204, 205, and 206 included in the recommended group action 750, in correspondence to the twelfth touch 702.

The control unit 110 of the electronic apparatus 100 may transmit the generated control command to the server 300 by using the communication unit 130. The control unit 110 may generate control commands corresponding to the apparatuses 201, 204, 205, and 206, respectively, (e.g., a control command that corresponds to the apparatus 201). Alternatively, the control unit 110 of the electronic apparatus 100 may generate one integrated control command that corresponds to all of the apparatuses 201, 204, 205, and 206. A structure of the control command transmitted via the communication unit 130 may be hierarchical.

The control packet corresponding to the control command may be configured of three frames including a MAC header (not shown) corresponding to an address and a length of a receiver (e.g., a server), a payload (not shown) corresponding to status change information of the external apparatus 200, and a cyclic redundancy check (CRC) corresponding to detecting a transmission error.

The control unit 110 of the electronic apparatus 100 may store, in the storage unit 175, the recommended group action or the control command that is generated in correspondence to the recommended group action.

Referring to FIG. 4, in operation S460, a status of the external apparatus 200 is changed in correspondence to the recommended group action.

Referring to FIG. 7E, the control unit 310 of the server 300 may receive, via the communication unit 330, the control command that corresponds to the recommended group action transmitted from the electronic apparatus 100. The received control command may be stored in the storage unit 375, according to control of the control unit 310.

The control unit 310 may transmit, by using a plurality of pieces of stored external apparatus information, the received control commands respectively to the apparatuses 201, 204, 205, and 206 whose statuses are to be changed. The control unit 310 may transmit one integrated control command to each of the apparatuses 201, 204, 205, and 206. Respective control units of the apparatuses 201, 204, 205, and 206 may extract, from the one integrated control command, control commands that respectively correspond to the apparatuses 201, 204, 205, and 206, and may change respective statuses thereof.

Each of the control units of the apparatuses 201, 204, 205, and 206 may receive the control command by using the communication unit 230. Each of the control units of the apparatuses 201, 204, 205, and 206 may store the received control command in the storage unit 275.

Each of the control units of the apparatuses 201, 204, 205, and 206 may change each status of the apparatuses 201, 204, 205, and 206, in response to the received control command. For example, the control units of the apparatuses 201, 204, 205, and 206 may change their statuses to a power on status of the display apparatus 201, a power on status of the air conditioner 204, a power on status of the lamp 205, and an unlock status of the automatic door lock 206, respectively.

Respective control units of apparatuses 201, 204, 205, and 206 may transmit respective pieces of changed status information to the server 300.

The server 300 may receive, via the communication unit 330, the plurality of pieces of changed status information of the apparatuses 201, 204, 205, and 206. The server 300 may transmit, via the communication unit 330, the plurality of pieces of changed status information of the apparatuses 201, 204, 205, and 206 to the electronic apparatus 100. The electronic apparatus 100 may receive, via the communication unit 130, the plurality of pieces of changed status information of the apparatuses 201, 204, 205, and 206, wherein the plurality of pieces of changed status information were changed in correspondence to execution of the recommended group action 750.

Referring to FIG. 4, in operation S460, when a status of the external apparatus 200 is changed, the method of controlling a group action, the method being performed by the electronic apparatus 100, is ended.

Figure 5:
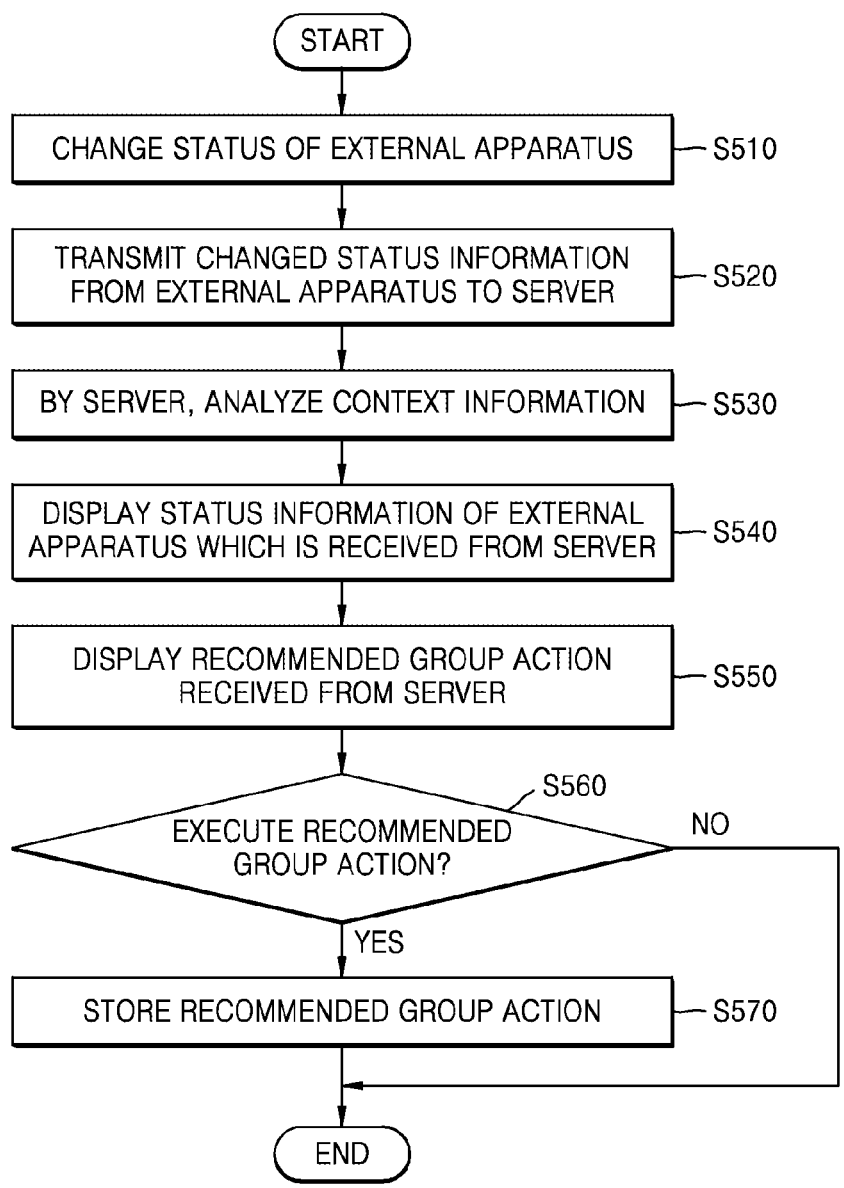
FIG. 5 is a flowchart of a method of controlling a group action among an electronic apparatus, an external apparatus, and a server according to an embodiment of the present disclosure.

FIG. 5 is a flowchart of a method of controlling a group action among an electronic apparatus, an external apparatus, and a server 300 according to an embodiment of the present disclosure.

FIGS. 8A to 8G illustrate example screens of an electronic apparatus according to various embodiments of the present disclosure.

Referring to FIG. 5, in operation S510, a status of the external apparatus 200 is changed.

Figure 8B:
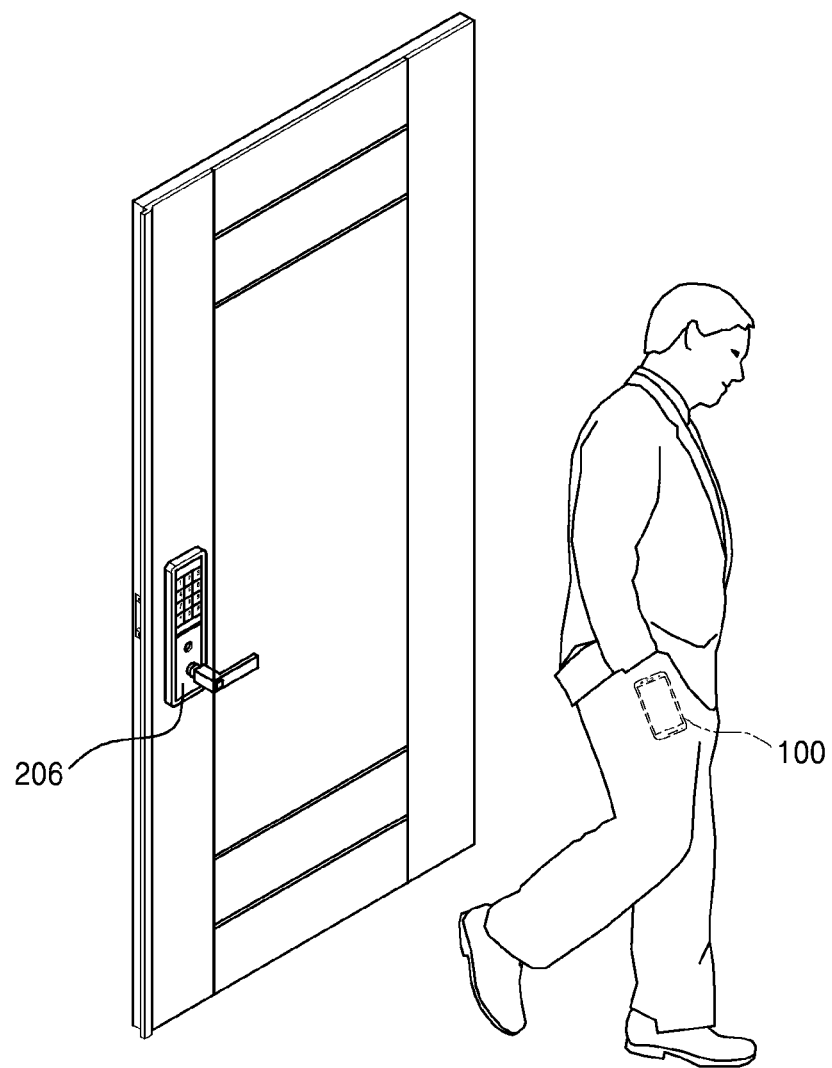

Referring to FIGS. 8A and 8B, a user may change a status of the automatic door lock 206 to a lock status. When the user goes out, statuses of the display apparatus 201, the air conditioner 204, and the lamp 205 may remain unchanged from among the external apparatuses 200. Statuses of the robotic vacuum cleaner 202 and the washing machine 203 are not changed, compared to their initial statuses (e.g., a power off status).

A control unit of the automatic door lock 206 may store changed status information in a storage unit of the automatic door lock 206.

Status information stored in a storage unit of the display apparatus 201 may be equal to that shown in Table 1 according to the previous embodiment, and thus, overlapping descriptions thereof are omitted here.

Referring to FIG. 5, in operation S520, changed status information of the external apparatus 200 is transmitted to the server 300.

Referring to FIG. 8A, the control unit 210 of the automatic door lock 206 may transmit information about the changed status to the server 300. The control unit 210 of the automatic door lock 206 may transmit changed status information to the server 300. The changed status information may be status information including changed items from among items included in the status information or may be status information including the changed items and some items from among unchanged items. The control unit 210 of the automatic door lock 206 may transmit the changed status information to the server 300 by using server information stored in the storage unit 275.

When status information of the electronic apparatus 100 is changed (e.g., a location of the electronic apparatus 100 is changed from a location in a house to a location outside the house), the control unit 110 of the electronic apparatus 100 may transmit changed status information of the electronic apparatus 100 to the server 300. The control unit 110 of the electronic apparatus 100 may store the changed status information in the storage unit 175. The changed status information of the electronic apparatus 100, which is stored in the storage unit 175, may include a change ID for history management, a status change time, a location before the change, a location after the change, or the like.

Referring to FIG. 5, in operation S530, context information is analyzed by the server 300.

The control unit 310 of the server 300 may store status information of the automatic door lock 206 in the storage unit 375. The status information stored in the storage unit 375 of the server 300 may be equal to that shown in Table 3 according to the previous embodiment, and thus, overlapping descriptions thereof are omitted here.

The storage unit 375 of the server 300 may store, according to control by the control unit 310, status information of the external apparatus 200 and status information of the electronic apparatus 100.

Each of the plurality of pieces of stored status information may be managed by management software (not shown). In order to analyze each status information of the external apparatus 200 and the electronic apparatus 100, the management software may use a K-means clustering algorithm or a cross-correlation algorithm that is capable of searching for time-series similarity. It will be obvious to one of ordinary skill in the art that various similarity search algorithms as well as the aforementioned algorithms may be used.

The management software may analyze the status of the external apparatus 200 by using the status information of the electronic apparatus 100 and the status information of the external apparatus 200, may extract a characteristic from the status, may learn the characteristic, and may deduce a characteristic. Also, management software may analyze the status of the electronic apparatus 100 by using the status information of the electronic apparatus 100 and the status information of the external apparatus 200, may extract a characteristic from the status, may learn the characteristic, and may deduce a characteristic.

The storage unit 375 of the server 300 may store, according to control by the control unit 310, a user's external apparatus use history corresponding to the changed status information of the external apparatus 200 and a user's electronic apparatus use history corresponding to the changed status information of the electronic apparatus 100. Each of the external apparatus use history and the electronic apparatus use history may be managed by the management software. The management software may extract a characteristic from the external apparatus use history, may learn the characteristic, and may deduce a characteristic. The management software may extract a characteristic from the electronic apparatus use history, may learn the characteristic, and may deduce a characteristic.

The management software may generate a group action or a plurality of group actions corresponding to the analysis. For example, when the user goes out (e.g., status information (e.g., spatial information) of the electronic apparatus 100 carried by the user is changed) without changing a status of the external apparatus 200, the management software may check a status of the external apparatus 200 that corresponds to the status information of the electronic apparatus 100. When the status of the external apparatus 200 is not changed, the management software may recommend an external apparatus (e.g., the external apparatus that corresponds to a group action) requiring a status change to the user.

When the user goes to sleep (e.g., status information of the electronic apparatus 100 carried by the user is changed (e.g., a target sleep time elapses) without changing a status of the external apparatus 200, the management software may check a status of the external apparatus 200 that corresponds to the status information of the electronic apparatus 100. When the status of the external apparatus 200 is not changed, the management software may recommend an external apparatus (e.g., the external apparatus that corresponds to a group action) requiring a status change to the user. Also, when biological information (e.g., pulse, a body temperature, etc.) about the user and environmental information (e.g., temperature, humidity, or the like within a house) of the external apparatus 200 are changed, the management software may recommend an external apparatus (e.g., the external apparatus that corresponds to a group action) requiring a status change to the user.

When the user goes to sleep (e.g., status information (e.g., time information) of the electronic apparatus 100 carried by the user is changed) without changing a status of the external apparatus 200, the management software may check a status of the external apparatus 200 that corresponds to the status information of the electronic apparatus 100. When the status of the external apparatus 200 is not changed, the management software may recommend an external apparatus (e.g., the external apparatus that corresponds to a group action) requiring a status change to the user.

The storage unit 375 may store, according to control by the control unit 310, the generated group action or the plurality of generated group actions.

The control unit 310 of the server 300 may transmit, to the electronic apparatus 100, the status information of the external apparatus 200 (e.g., the status information of the automatic door lock 206) by using the communication unit 330. The control unit 310 of the server 300 may transmit, to the electronic apparatus 100, one or more generated group actions by using the communication unit 330. The control unit 310 of the server 300 may transmit, via the communication unit 330, one or more generated group actions to each of the external apparatuses 200.

Referring to FIG. 5, in operation S540, the status information of the external apparatus 200 which is received from the server 300 is displayed.

The control unit 110 of the electronic apparatus 100 may receive the status information of the external apparatus 200 from the server 300 by using the communication unit 130. The received status information may include a plurality of pieces of status information of the external apparatuses 200 that are most recently changed, or a plurality of pieces of status information of the apparatus 201, 202, 203, 204, 205, and 206 corresponding to a status change (e.g., a location is changed from a location in a house to a location outside the house) of the electronic apparatus 100.

Figure 8C:
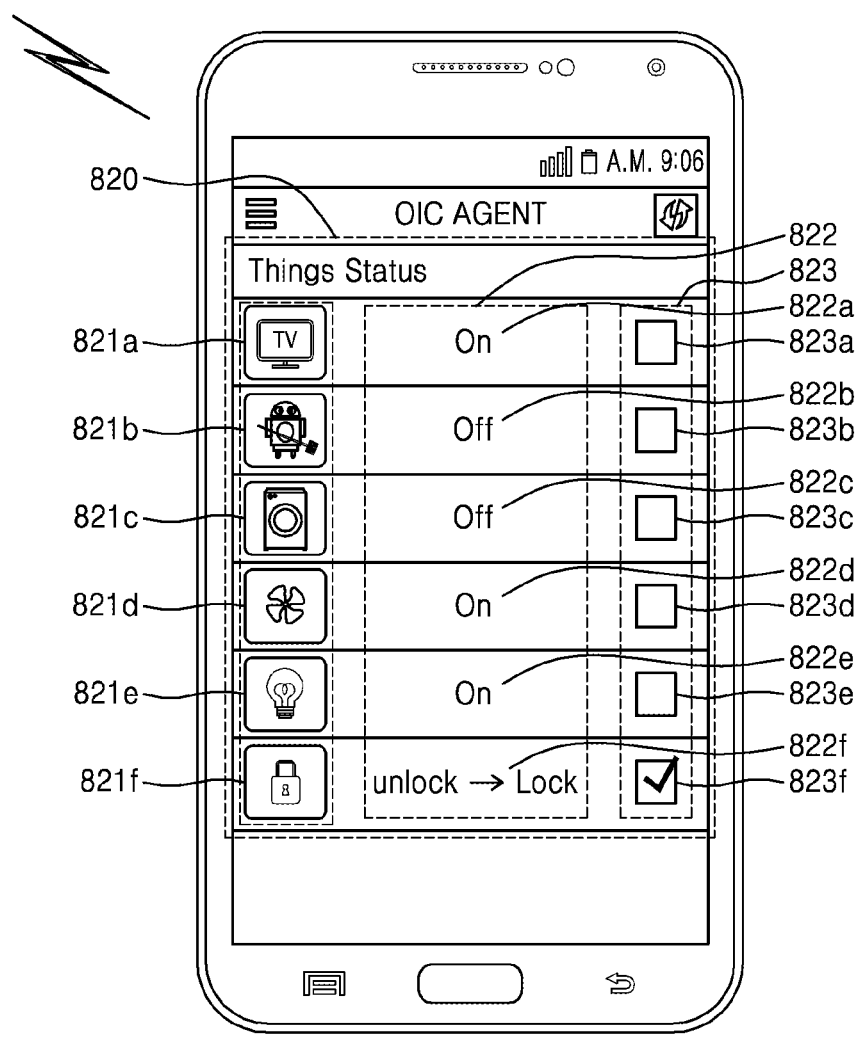

Referring to FIG. 8C, the control unit 110 of the electronic apparatus 100 may display received external apparatus status information 820 of the external apparatuses 200 on a screen of the electronic apparatus 100. From the external apparatus status information 820, icons 821a-821f corresponding to the external apparatuses 200, changed statuses 822a-822f, and selection boxes 823a-823f may be displayed on the screen. Status information of the automatic door lock 206 from among the apparatuses 201, 202, 203, 204, 205, and 206 may be changed and displayed.

The control unit 110 may store, in the storage unit 175, the external apparatus status information 820 received by using the communication unit 130.

Referring to FIG. 5, in operation S550, a received recommended group action is displayed.

Figure 8D:
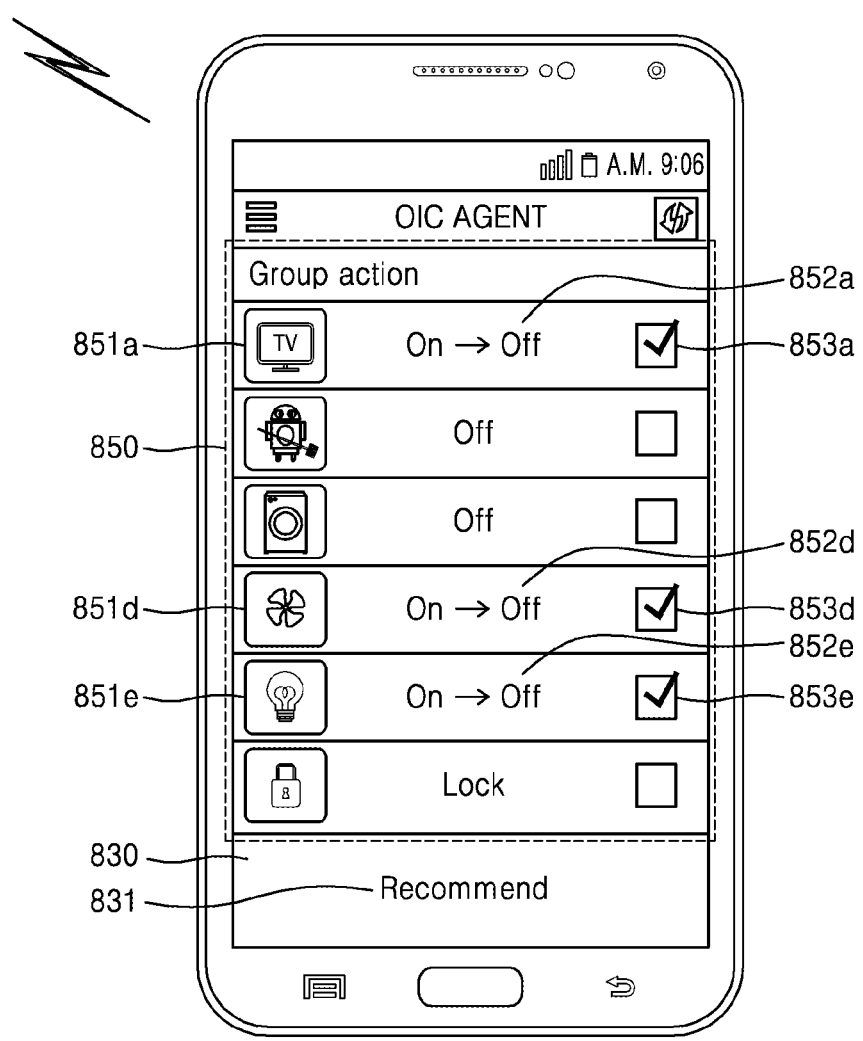

Referring to FIG. 8D, the control unit 110 of the electronic apparatus 100 may display a recommended group action received from the server 300. The control unit 110 may display the recommended group action after status information 850 of the external apparatus 200.

The control unit 110 of the electronic apparatus 100 may simultaneously display differently the status information 850 of the external apparatus 200 and the recommended group action received from the server 300.

The control unit 110 of the electronic apparatus 100 may display icons 851a, 852d, 852e, status information 852a, 852d, and 852e, and selection boxes 853a, 853d, and 853e from among the status information 850 of the external apparatus 200 differently from the recommended group action. Alternatively, the control unit 110 of the electronic apparatus 100 may display both the plurality of pieces of status information 852a, 852d, and 852e and the selection boxes 853a, 853d, and 853e of the status information 850 of the external apparatus 200 differently from the recommended group action. For example, at least one of a font, a font size, a font color, and a background color of the plurality of pieces of status information 852a, 852d, and 852e may be changed and thus may be displayed differently from others. Alternatively, at least one of a box size, a box line color, a box inner color, a checkmark, and a checkmark color of the selection boxes 853a, 853d, and 853e may be changed and thus may be displayed differently from others.

The control unit 110 of the electronic apparatus 100 may display the external apparatuses 200 of the recommended group action according to power consumption (e.g., in a descending order of power consumption) or according to user's preference. When the recommended group action is executed, an external apparatus whose power consumption is higher than power consumption of other external apparatuses 200 may be executed first (e.g., a status change). In this case, in-house power consumption may be decreased.

When the recommended group action is executed, an external apparatus that is preferred by a user over other external apparatuses 200 may be executed first (e.g., a status change).

The control unit 110 of the electronic apparatus 100 may display a text 831 corresponding to "Recommended group action" on an interaction area 830. When a display time of the text 831, which is a predefined time (e.g., 1 second—changeable), elapses, the control unit 110 may not display the text 831.

Referring to FIG. 5, in operation S560, the recommended group action is executed.

Figure 8E:
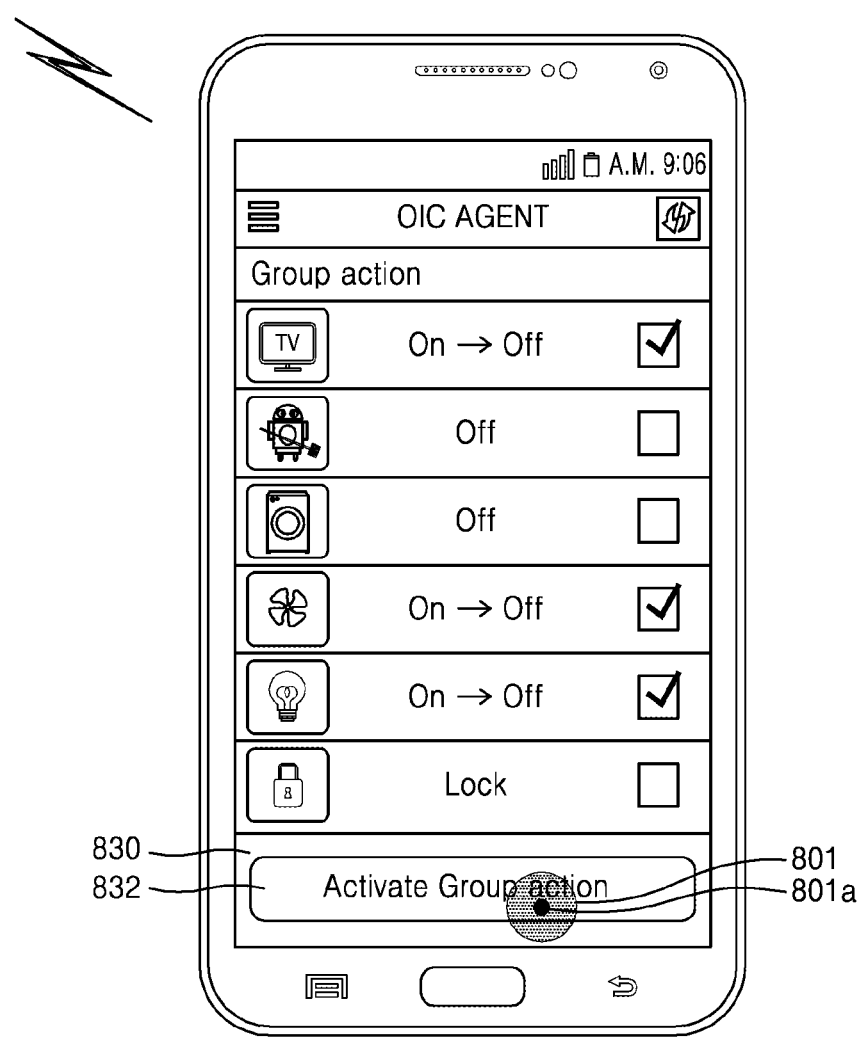

Referring to FIG. 8E, when a displayed recommended group action is executed, a user performs a twenty-first touch 801 on a button 832 corresponding to execution of the recommended group action. The control unit 110 of the electronic apparatus 100 may detect the twenty-first touch 801 by using the touchscreen 190 and the touchscreen controller 195. The control unit 110 of the electronic apparatus 100 may calculate a twenty-first touch location 801a (e.g., X21 and Y21 coordinates) corresponding to the twenty-first touch 801, by using an electric signal received from the touchscreen controller 195.

The control unit 110 of the electronic apparatus 100 may store, in the storage unit 175, twenty-first touch location information that corresponds to the twenty-first touch location 801a. The stored twenty-first touch location information may include a touch ID for history management, a touch location, a touch detection time, touch information (e.g., a touch pressure, a touch direction, a touch duration time, etc.), or the like.

The control unit 110 of the electronic apparatus 100 may generate a control command (e.g., a control packet) for changing statuses of the apparatuses 201, 204, and 205 included in a recommended group action 850, in correspondence to the twenty-first touch 801.

The control unit 110 of the electronic apparatus 100 may transmit the generated control command to the server 300 by using the communication unit 130. The control unit 110 of the electronic apparatus 100 may generate control commands corresponding to the apparatuses 201, 204, and 205, respectively, (e.g., a control command that corresponds to the apparatus 201). Alternatively, the control unit 110 of the electronic apparatus 100 may generate one integrated control command that corresponds to all of the apparatuses 201, 204, and 205. A structure of the control command transmitted via the communication unit 130 may be hierarchical.

The control packet corresponding to the control command may be configured of three frames including a MAC header (not shown) corresponding to an address and a length of a receiver (e.g., a server), a payload (not shown) corresponding to status change information of the external apparatus 200, and a CRC corresponding to detecting a transmission error.

Figure 8F:
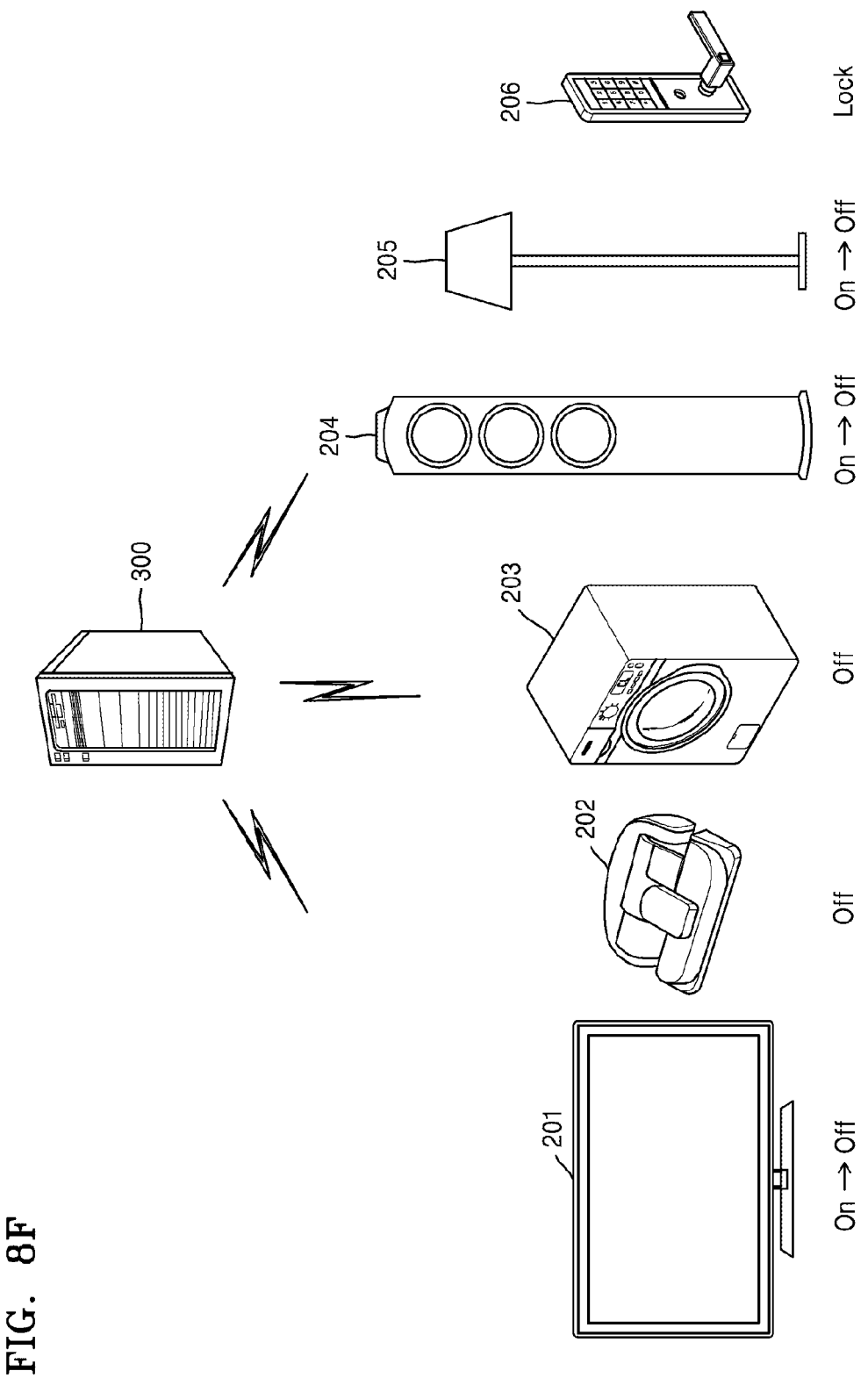

Referring to FIG. 8F, the control unit 310 of the server 300 may receive, via the communication unit 330, the control command transmitted from the electronic apparatus 100. The received control command may be stored in the storage unit 375, according to control of the control unit 310.

The control unit 310 may transmit, by using a plurality of pieces of stored external apparatus information, the received control commands respectively to the apparatuses 201, 204, and 205 whose statuses are to be changed. The control unit 310 may transmit one integrated control command to each of the apparatuses 201, 204, and 205. Respective control units of the apparatuses 201, 204, and 205 may extract, from the one integrated control command, control commands that respectively correspond to the apparatuses 201, 204, and 205, and may change the respective statuses thereof.

Each of the control units of the apparatuses 201, 204, and 205 may receive the control command by using the communication unit 230. Each of the control units of the apparatuses 201, 204, and 205 may store the received control command in the storage unit 275.

The control units of the apparatuses 201, 204, and 205 may change statuses of the apparatuses 201, 204, and 205, respectively, in correspondence to the received control command. For example, the control units of the apparatuses 201, 204, and 205 may change their statuses to a power off status of the display apparatus 201, a power off status of the air conditioner 204, and a power off status of the lamp 205, respectively.

In another embodiment, when a user turns off a morning alarm that is ringing in the electronic apparatus 100, the electronic apparatus 100 may receive, from the server 300, a recommended group action that corresponds to a status change (e.g., the end of the morning call) of the electronic apparatus 100. For example, the recommended group action that corresponds to the end of the morning alarm may include stepwise lighting a lamp (not shown), turning on a TV, or the like. If a time (e.g., 30 sec (changeable)) that is input or set by the user elapses, the control unit 110 of the electronic apparatus 100 may execute the received recommended group action.

Referring to FIG. 5, in operation S570, the recommended group action is stored.

Figure 8G:
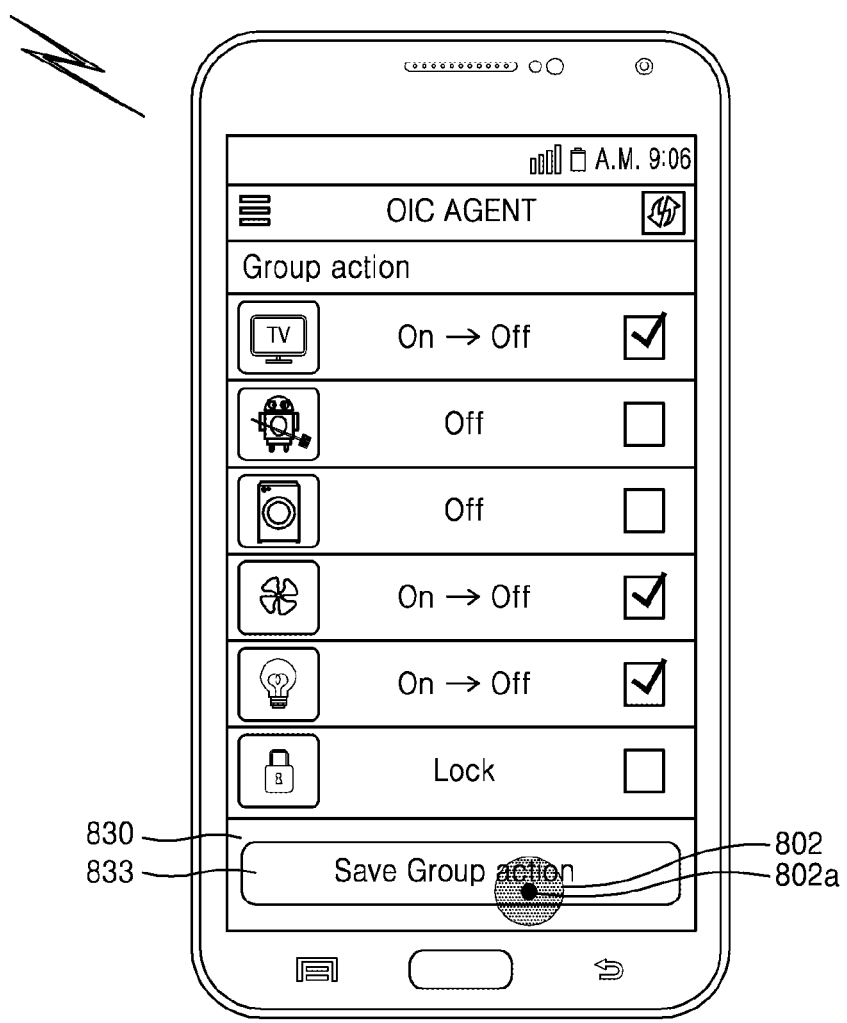

Referring to FIG. 8G, the control unit 110 of the electronic apparatus 100 may display, on an interaction area 830, a button 833 that is selectable for "save group action", in correspondence to a twenty-first touch 801.

When any item from among items 821-823 displayed on a recommended group action 820 is not changed, the user performs a twenty-second touch 802 on the button 833. The control unit 110 of the electronic apparatus 100 may detect the twenty-second touch 802 by using the touchscreen 190 and the touchscreen controller 195. The detection of the twenty-second touch 802, by the control unit 110, is substantially similar (e.g., different touch names) to the twenty-first touch 801, and thus, overlapping descriptions thereof are omitted here.

The control unit 110 of the electronic apparatus 100 may display the keypad 166 and an input window for a new group action title (not shown) on the screen, in correspondence to the twenty-second touch 802. The user may input the new group action title by using the keypad 166. The input new group action title may be "go out2". When a new group action is input, the user may select "OK" (not shown) displayed on the screen.

The control unit 110 of the electronic apparatus 100 may provide the user with a feedback corresponding to storage of a group action. The feedback provided by the electronic apparatus 100 may be provided as one of visual feedback, acoustic feedback, and tactile feedback to the user. The control unit 110 of the electronic apparatus 100 may provide the user with one of the visual feedback, the acoustic feedback, and the tactile feedback or a combination of the visual feedback, the acoustic feedback, and the tactile feedback via the electronic apparatus 100.

The visual feedback may be displayed differently from an object displayed in the application 600, wherein the visual feedback has a visual effect (e.g., a separate image or an animation effect such as a fade-in or fade-out effect applied to the separate image) that corresponds to storage of the group action. The acoustic feedback may be output from the speaker 163, as sound that corresponds to storage of the group action. The tactile feedback may be output from the vibration motor 164, in correspondence to storage of the group action.

Feedback (e.g., at least one of the visual feedback, the acoustic feedback, and the tactile feedback) that corresponds to storage of the group action may be selected and/or changed in a configuration setting (not shown) of the electronic apparatus 100.

The user may input and/or may change a feedback provision time (e.g., 300 ms, changeable) during which at least one feedback is provided to the user.

In correspondence to the twenty-second touch 802, the control unit 110 of the electronic apparatus 100 may store, in the storage unit 175, a title (e.g., "go out2") of a recommended group action and status information corresponding to the recommended group action.

Referring to FIG. 5, in operation S570, when the recommended group action is stored, the method of controlling a group action, the method being performed by the electronic apparatus 100, is ended.

The one or more embodiments may provide an electronic apparatus and a method of controlling a group action, the method being performed by the electronic apparatus that is capable of creating the group action corresponding to a status change of an external apparatus and is also capable of changing the status of the external apparatus via the created group action.

The one or more embodiments may also provide an electronic apparatus and a method of controlling a group action, the method being performed by the electronic apparatus that is capable of creating the group action corresponding to external apparatus status information received via a server and is also capable of changing the status of the external apparatus via the created group action.

The one or more embodiments may also provide an electronic apparatus and a method of controlling a group action, the method being performed by the electronic apparatus that is capable of receiving a recommended group action corresponding to a status of an external apparatus from a server that analyzes status information of the external apparatus and is also capable of changing the status of the external apparatus via the recommended group action.

The one or more embodiments may also provide an electronic apparatus and a method of controlling a group action, the method being performed by the electronic apparatus that is capable of receiving the group action corresponding to a status change of the electronic apparatus and is also capable of changing a status of an external apparatus.

The inventive concept is not limited to the one or more embodiments, and may provide an electronic apparatus and a method of controlling a group action, the method being performed by the electronic apparatus that is capable of creating the group action corresponding to a status change of an external apparatus and is also capable of changing the status of the external apparatus via the created group action.

The one or more of the above embodiments of the inventive concept can also be embodied as programmed commands to be executed in various computer means, and then can be recorded to a non-transitory computer-readable recording medium. The non-transitory computer-readable recording medium may include one or more of the programmed commands, data files, data structures, or the like. The non-transitory computer-readable recording medium that is erasable or is re-recordable may be embodied as a volatile or non-volatile storage device such as a ROM, a memory such as a RAM, a memory chip, or an integrated circuit, or a storage medium such as a compact disc (CD), a digital versatile disc (DVD), a magnetic disc or a magnetic tape that is optically or magnetically recordable and simultaneously is readable by a machine (e.g., a computer). A memory that may be included in a mobile terminal is an example of a machine-readable storing medium for storing one or more programs that include instructions to implement one or more of the above embodiments. The programmed commands recorded in the non-transitory computer-readable recording medium may be particularly designed or configured for the inventive concept or may be well-known to one of ordinary skill in the art.

It should be understood that the embodiments described herein should be considered descriptive and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling a group action, the method being performed by an electronic apparatus that is connectable to at least one external apparatus and a server, the method comprising:
   obtaining status change information indicating a change of status of the electronic apparatus;
   sending the status change information of the electronic apparatus to the server;
   receiving external apparatus status information of the at least one external apparatus from the server, wherein the at least one external apparatus is determined based on i) the change of the status of the electronic apparatus, ii) time information indicating a time of the change of the status of the electronic apparatus and iii) a previous status of the at least one external apparatus;
   displaying a list indicating status of the at least one external apparatus based on the external apparatus status information; and
   creating a group action based on a user input to the displayed list,
   wherein the external apparatus status information includes information regarding a change of status of the at least one external apparatus.

2. The method of claim 1, wherein the external apparatus status information comprises an identifier, a name, operation information, space information, environment information, available resource information, operation hi story information, or error information of the external apparatus.

3. The method of claim 1, wherein the sending of the status change information of the electronic apparatus comprises sending the status information when the status of the electronic apparatus is changed.

4. The method of claim 1, wherein the sending of the status change information of the electronic apparatus comprises sending status change information of the electronic apparatus when the status of the electronic apparatus is changed.

5. The method of claim 1, further comprising receiving the external apparatus status information from the at least one external apparatus when the electronic apparatus is not connected to the server.

6. The method of claim 1, wherein at least one icon respectively representing the at least one external apparatus is displayed in the displayed list according to a priority order.

7. The method of claim 1,
   wherein at least one object for selecting the at least one external apparatus is displayed in the list, and
   wherein the group action is created based on a user input to select the at least one object in the list.

8. The method of claim 1, wherein the group action comprises group action information comprising an identifier that corresponds to the external apparatus.

9. The method of claim 1, further comprising:
   storing the group action,
   wherein the stored group action comprises group action information comprising a group action title.

10. The method of claim 4,
    wherein the change of the status of the electronic apparatus comprises a change in a location of the electronic apparatus, and
    wherein the change in the location is detected by the electronic apparatus or is detected via a connection between the electronic apparatus and the external apparatus.

11. The method of claim 9, further comprising, while storing the group action, providing at least one of visual feedback, acoustic feedback, or tactile feedback.

12. An electronic apparatus comprising:
    a touchscreen;
    a memory storing one or more instructions; and
    at least one processor configured to execute the one or more instructions to:
    connect to a server,
    obtain status change information indicating a change of status of the electronic apparatus,
    send the status change information of the electronic apparatus to the server,
    receive external apparatus status information of at least one external apparatus from the server, wherein the at least one external apparatus is determined based on i) the change of the status of the electronic apparatus, ii) time information indicating a time of the change of the status of the electronic apparatus and iii) a previous status of the at least one external apparatus, display a list indicating status of the at least one external apparatus based on the external apparatus status information, and create a group action based on a user input to the displayed list by using the external apparatus status information that is received from the server, wherein the external apparatus status information includes information regarding a change of status of the at least one external apparatus.

13. The electronic apparatus of claim 12, further comprising:

a global positioning system (GPS) configured to receive a location signal, wherein the processor is further configured to execute the one or more instructions to detect a change in the location of the electronic apparatus based on the location signal.

14. The electronic apparatus of claim 12, wherein when the electronic apparatus is not connected to the server, the processor is further configured to execute the one or more instructions to receive the external apparatus status information from the at least one external apparatus.

15. The electronic apparatus of claim 12, wherein at least one icon respectively representing the at least one external apparatus is displayed in the displayed list according to a priority order.

16. The electronic apparatus of claim 12, wherein at least one object for selecting the at least one external apparatus is displayed in the list, and wherein the group action is created based on a user input to select the at least one object in the list.

17. The electronic apparatus of claim 13, wherein the processor is further configured to execute the one or more instructions to send the status change information of the electronic apparatus when the status of the electronic apparatus is changed.

18. The electronic apparatus of claim 13, wherein the processor is further configured to execute the one or more instructions to send the status change information of the electronic apparatus when the status of the electronic apparatus is changed.

19. A non-transitory computer-readable recording medium having recorded thereon a program for causing a computer included in a device to execute a method of controlling group action, the method comprising:

obtaining status change information indicating a change of status of the electronic apparatus;

sending the status change information of an electronic apparatus to a server;

receiving external apparatus status information of the at least one external apparatus from the server, wherein the at least one external apparatus is determined based on i) the change of the status of the electronic apparatus, ii) time information indicating a time of the change of the status of the electronic apparatus and iii) a previous status of the at least one external apparatus;

displaying a list indicating status of the at least one external apparatus based on the external apparatus status information; and creating a group action based on a user input to the displayed list, wherein the external apparatus status information includes information regarding a change of status of the at least one external apparatus.

* * * * *